(12) United States Patent
Balusu et al.

(10) Patent No.: US 12,412,149 B2
(45) Date of Patent: Sep. 9, 2025

(54) SYSTEMS AND METHODS FOR ANALYZING AND LABELING IMAGES IN A RETAIL FACILITY

(71) Applicant: WALMART APOLLO, LLC, Bentonville, AR (US)

(72) Inventors: Raghava Balusu, Achanta (IN); Siddhartha Chakraborty, Kolkata (IN); Ashlin Ghosh, Ernakulam (IN); Avinash M. Jade, Bangalore (IN); Lingfeng Zhang, Dallas, TX (US); Amit Jhunjhunwala, Bangalore (IN)

(73) Assignee: Walmart Apollo, LLC, Bentonville, AR (US)

( * ) Notice: Subject to any disclaimer, the term of this patent is extended or adjusted under 35 U.S.C. 154(b) by 246 days.

(21) Appl. No.: 18/161,788

(22) Filed: Jan. 30, 2023

(65) Prior Publication Data
US 2024/0257047 A1   Aug. 1, 2024

(51) Int. Cl.
*G06Q 10/087*   (2023.01)
*G06V 10/762*   (2022.01)

(52) U.S. Cl.
CPC ......... *G06Q 10/087* (2013.01); *G06V 10/762* (2022.01)

(58) Field of Classification Search
CPC .......................... G06Q 10/087; G06V 10/762
See application file for complete search history.

(56) References Cited

U.S. PATENT DOCUMENTS

| | | |
|---|---|---|
| 5,074,594 A | 12/1991 | Laganowski |
| 6,570,492 B1 | 5/2003 | Peratoner |
| 8,700,494 B2 | 4/2014 | Carlson |
| 8,923,650 B2 | 12/2014 | Wexler |

(Continued)

FOREIGN PATENT DOCUMENTS

| | | |
|---|---|---|
| CN | 106347550 B | 8/2019 |
| CN | 110348439 B | 10/2019 |

(Continued)

OTHER PUBLICATIONS

U.S. Appl. No. 17/963,751, filed Oct. 11, 2022, Yilun Chen.
(Continued)

*Primary Examiner* — Florian M Zeender
*Assistant Examiner* — Joseph M Mutschler
(74) *Attorney, Agent, or Firm* — Foley IP Law, PLLC

(57) ABSTRACT

In some embodiments, apparatuses and methods are provided herein useful to processing captured images. In some embodiments, there is provided a system for processing captured images of objects including a memory and a control circuit executing a trained machine learning model. The memory may be configured to store a plurality of images comprising first images and second images. The control circuit may be configured to: allocate each of the first images into one of a plurality of datasets; cluster each image in the dataset into one of a plurality of groups; select a sample from at least one of the plurality of groups; cluster each of the second images into one of dominant product identifier group and a non-dominant product identifier (Continued)

group; select a sample from the dominant product identifier group and a sample from the non-dominant product identifier group; and output the selected sample.

20 Claims, 10 Drawing Sheets

(56) References Cited

U.S. PATENT DOCUMENTS

| | | | |
|---|---|---|---|
| 8,965,104 | B1 | 2/2015 | Hickman |
| 9,275,308 | B2 | 3/2016 | Szegedy |
| 9,477,955 | B2 | 10/2016 | Goncalves |
| 9,526,127 | B1 | 12/2016 | Taubman |
| 9,576,310 | B2 | 2/2017 | Cancro |
| 9,659,204 | B2 | 5/2017 | Wu |
| 9,811,754 | B2 | 11/2017 | Schwartz |
| 10,002,344 | B2 | 6/2018 | Wu |
| 10,019,803 | B2 | 7/2018 | Venable |
| 10,032,072 | B1 | 7/2018 | Tran |
| 10,129,524 | B2 | 11/2018 | Ng |
| 10,210,432 | B2 | 2/2019 | Pisoni |
| 10,373,116 | B2 | 8/2019 | Medina |
| 10,572,757 | B2 | 2/2020 | Graham |
| 10,592,854 | B2 | 3/2020 | Schwartz |
| 10,796,352 | B2 | 10/2020 | Chechuy |
| 10,839,452 | B1 | 11/2020 | Guo |
| 10,922,574 | B1 | 2/2021 | Tariq |
| 10,943,278 | B2 | 3/2021 | Benkreira |
| 10,956,711 | B2 | 3/2021 | Adato |
| 10,990,950 | B2 | 4/2021 | Garner |
| 10,991,036 | B1 | 4/2021 | Bergstrom |
| 11,036,949 | B2 | 6/2021 | Powell |
| 11,055,905 | B2 | 7/2021 | Tagra |
| 11,087,272 | B2 | 8/2021 | Skaff |
| 11,151,426 | B2 | 10/2021 | Dutta |
| 11,163,805 | B2 | 11/2021 | Arocho |
| 11,276,034 | B2 | 3/2022 | Shah |
| 11,282,287 | B2 | 3/2022 | Gausebeck |
| 11,295,163 | B1 | 4/2022 | Schoner |
| 11,308,775 | B1 | 4/2022 | Sinha |
| 11,409,977 | B1 | 8/2022 | Glaser |
| 2005/0238465 | A1 | 10/2005 | Razumov |
| 2010/0188580 | A1 | 7/2010 | Paschalaks |
| 2011/0040427 | A1 | 2/2011 | Ben-Tzvi |
| 2012/0303412 | A1 | 11/2012 | Etzioni |
| 2014/0002239 | A1 | 1/2014 | Rayner |
| 2014/0247116 | A1 | 9/2014 | Davidson |
| 2014/0307938 | A1 | 10/2014 | Doi |
| 2015/0363660 | A1 | 12/2015 | Vidal |
| 2016/0203525 | A1 | 7/2016 | Hara |
| 2017/0106738 | A1 | 4/2017 | Gillett |
| 2017/0286773 | A1 | 10/2017 | Skaff |
| 2018/0005176 | A1 | 1/2018 | Williams |
| 2018/0018788 | A1 | 1/2018 | Olmstead |
| 2018/0108134 | A1 | 4/2018 | Venable |
| 2018/0197223 | A1 | 7/2018 | Grossman |
| 2018/0260772 | A1 | 9/2018 | Chaubard |
| 2019/0025849 | A1 | 1/2019 | Dean |
| 2019/0043003 | A1 | 2/2019 | Fisher |
| 2019/0050427 | A1 | 2/2019 | Wiesel et al. |
| 2019/0050932 | A1 | 2/2019 | Dey |
| 2019/0087772 | A1 | 3/2019 | Medina |
| 2019/0163698 | A1 | 5/2019 | Kwon |
| 2019/0180150 | A1 | 6/2019 | Taylor et al. |
| 2019/0197561 | A1 | 6/2019 | Adato |
| 2019/0220482 | A1 | 7/2019 | Crosby |
| 2019/0236531 | A1 | 8/2019 | Adato |
| 2020/0118063 | A1 | 4/2020 | Fu |
| 2020/0246977 | A1 | 8/2020 | Swietojanski |
| 2020/0265494 | A1 | 8/2020 | Glaser |
| 2020/0324976 | A1 | 10/2020 | Diehr |
| 2020/0356813 | A1 | 11/2020 | Sharma |
| 2020/0380226 | A1 | 12/2020 | Rodriguez |
| 2020/0387858 | A1 | 12/2020 | Hasan |
| 2021/0049541 | A1 | 2/2021 | Gong |
| 2021/0049542 | A1 | 2/2021 | Dalal |
| 2021/0142105 | A1 | 5/2021 | Siskind |
| 2021/0150231 | A1 | 5/2021 | Kehl |
| 2021/0192780 | A1 | 6/2021 | Kulkarni |
| 2021/0216954 | A1 | 7/2021 | Chaubard |
| 2021/0272269 | A1 | 9/2021 | Suzuki |
| 2021/0319684 | A1 | 10/2021 | Ma |
| 2021/0342914 | A1 | 11/2021 | Dalal |
| 2021/0400195 | A1 | 12/2021 | Adato |
| 2021/0406812 | A1 | 12/2021 | Deshmukh |
| 2022/0043547 | A1 | 2/2022 | Jahjah |
| 2022/0051177 | A1* | 2/2022 | Savvides ............. G06F 16/5846 |
| 2022/0051179 | A1 | 2/2022 | Savvides |
| 2022/0058425 | A1 | 2/2022 | Savvides |
| 2022/0067085 | A1 | 3/2022 | Nihas |
| 2022/0114403 | A1 | 4/2022 | Shaw |
| 2022/0114821 | A1 | 4/2022 | Arroyo |
| 2022/0138914 | A1 | 5/2022 | Wang |
| 2022/0165074 | A1 | 5/2022 | Srivastava |
| 2022/0222924 | A1* | 7/2022 | Pan ................... G06V 10/7625 |
| 2022/0262008 | A1 | 8/2022 | Kidd |
| 2022/0406030 | A1 | 12/2022 | Zheng et al. |
| 2023/0004736 | A1* | 1/2023 | Glaser ............... G06K 7/10722 |
| 2023/0252343 | A1 | 8/2023 | McDaniel et al. |

FOREIGN PATENT DOCUMENTS

| | | |
|---|---|---|
| CN | 110443298 B | 2/2022 |
| CN | 114898358 A | 8/2022 |
| CN | 115205584 A | 10/2022 |
| EP | 3217324 A1 | 9/2017 |
| EP | 3437031 | 2/2019 |
| EP | 3479298 | 5/2019 |
| WO | 2006113281 A2 | 10/2006 |
| WO | 2017201490 A1 | 11/2017 |
| WO | 2018093796 | 5/2018 |
| WO | 2020051213 A1 | 3/2020 |
| WO | 2021186176 A1 | 9/2021 |
| WO | 2021247420 A2 | 12/2021 |

OTHER PUBLICATIONS

U.S. Appl. No. 17/963,787, filed Oct. 11, 2022, Lingfeng Zhang.
U.S. Appl. No. 17/963,802, filed Oct. 11, 2022, Lingfeng Zhang.
U.S. Appl. No. 17/963,903, filed Oct. 11, 2022, Raghava Balusu.
U.S. Appl. No. 17/966,580, filed Oct. 14, 2022, Paarvendhan Puviyarasu.
U.S. Appl. No. 17/971,350, filed Oct. 21, 2022, Jing Wang.
U.S. Appl. No. 17/983,773, filed Nov. 9, 2022, Lingfeng Zhang.
U.S. Appl. No. 18/102,999, filed Jan. 30, 2023, Han Zhang.
U.S. Appl. No. 18/103,338, filed Jan. 30, 2023, Wei Wang.
U.S. Appl. No. 18/106,269, filed Feb. 6, 2023, Zhaoliang Duan.
U.S. Appl. No. 18/158,925, filed Jan. 24, 2023, Raghava Balusu.
U.S. Appl. No. 18/158,950, filed Jan. 24, 2023, Ishan Arora.
U.S. Appl. No. 18/158,969, filed Jan. 24, 2023, Zhaoliang Duan.
U.S. Appl. No. 18/158,983, filed Jan. 24, 2023, Ashlin Ghosh.
U.S. Appl. No. 18/165,152, filed Feb. 6, 2023, Han Zhang.
U.S. Appl. No. 18/168,174, filed Feb. 13, 2023, Abhinav Pachauri.
U.S. Appl. No. 18/168,198, filed Feb. 13, 2023, Ashlin Ghosh.
Chaudhuri, Abon et al.; "A Smart System for Selection of Optimal Product Images in E-Commerce"; 2018 IEEE Conference on Big Data (Big Data); Dec. 10-13, 2018; IEEE; <https://ieeexplore.ieee.org/document/8622259>; pp. 1728-1736.
Chenze, Brandon et al.; "Iterative Approach for Novel Entity Recognition of Foods in Social Media Messages"; 2022 IEEE 23rd International Conference on Information Reuse and Integration for Data Science (IRI); Aug. 9-11, 2022; IEEE; <https://ieeexplore.ieee.org/document/9874231>; 6 pages.
Kaur, Ramanpreet et al.; "A Brief Review on Image Stitching and Panorama Creation Methods"; International Journal of Control Theory and Applications; 2017; vol. 10, No. 28; International Science Press; Gurgaon, India; < https://www.researchgate.net/publication/348232877 >; 11 pages.
Naver Engineering Team; "Auto-classification of NAVER Shopping Product Categories using TensorFlow"; <https://blog.tensorflow.org/2019/05/auto-classification-of-naver-shopping.html>; May 20, 2019; pp. 1-15.

(56) References Cited

OTHER PUBLICATIONS

Paolanti, Marine et al.; "Mobile robot for retail surveying and inventory using visual and textual analysis of monocular pictures based on deep learning"; European Conference on Mobile Robots; Sep. 2017, 6 pages.

Refills; "Final 3D object perception and localization"; European Commision, Dec. 31, 2016, 16 pages.

Retech Labs; "Storx | RetechLabs"; <https://retechlabs.com/storx/>; available at least as early as Jun. 22, 2019; retrieved from Internet Archive Wayback Machine <https://web.archive.org/web/20190622012152/https://retechlabs.com/storx/> on Dec. 1, 2022; pp. 1-4.

Schroff, Florian et al.; "Facenet: a unified embedding for face recognition and clustering"; 2015 IEEE Conference on Computer Vision and Pattern Recognition (CVPR); Jun. 7-12, 2015; IEEE; <https://ieeexplore.ieee.org/document/7298682>; pp. 815-823.

Tan, Mingxing et al.; "EfficientDet: Scalable and Efficient Object Detection"; 2020 IEEE/CVF Conference on Computer Vision and Pattern Recognition (CVPR); Jun. 13-19, 2020; IEEE; <https://ieeexplore.ieee.org/document/9156454>; 6 pages.

Tan, Mingxing et al.; "EfficientNet: Rethinking Model Scaling for Convolutional Neural Networks"; Proceedings of the 36th International Conference on Machine Learning; 2019; vol. 97; PLMR; <http://proceedings.mlr.press/v97/tan19a.html>; pp. 6105-6114.

Technology Robotix Society; "Colour Detection"; <https://medium.com/image-processing-in-robotics/colour-detection-e15bc03b3f61>; Jul. 2, 2019; pp. 1-6.

Tonioni, Alessio et al.; "A deep learning pipeline for product recognition on store shelves"; 2018 IEEE International Conference on Image Processing, Applications and Systems (IPAS); Dec. 12-14, 2018; IEEE; <https://ieeexplore.ieee.org/document/8708890>; pp. 25-31.

Trax Retail; "Image Recognition Technology for Retail | Trax"; <https://traxretail.com/retail/>; available at least as early as Apr. 20, 2021; retrieved from Internet Wayback Machine <https://web.archive.org/web/20210420132348/https://traxretail.com/retail/> on Dec. 1, 2022; pp. 1-19.

Verma, Nishchal, et al.; "Object identification for inventory management using convolutional neural network"; IEEE Applied Imagery Pattern Recognition Workshop (AIPR); Oct. 2016, 6 pages.

Zhang, Jicun, et al.; "An Improved Louvain Algorithm for Community Detection"; Advanced Pattern and Structure Discovery from Complex Multimedia Data Environments 2021; Nov. 23, 2021; Mathematical Problems in Engineering; Hindawi; <https://www.hindawi.com/journals/mpe/2021/1485592/>; pp. 1-27.

Rodriquez, Kari, "International Search Report & Written Opinion", International Application No. PCT/US2024/012702, mailed Apr. 19, 2024, 7 pages.

* cited by examiner

SYSTEMS AND METHODS FOR ANALYZING AND LABELING IMAGES IN A RETAIL FACILITY

TECHNICAL FIELD

This invention relates generally to recognition of objects in images, and more specifically to training machine learning models to recognize objects in images.

BACKGROUND

A typical product storage facility (e.g., a retail store, a product distribution center, a warehouse, etc.) may have hundreds of shelves and thousands of products stored on the shelves or on pallets. It is common for workers of such product storage facilities to manually (e.g., visually) inspect or inventory product display shelves and/or pallet storage areas to determine which of the products are adequately stocked and which products are or will soon be out of stock and need to be replenished.

Given the very large number of product storage areas such as shelves, pallets, and other product displays at product storage facilities of large retailers, and the even larger number of products stored in the product storage areas, manual inspection of the products on the shelves/pallets by the workers is very time consuming and significantly increases the operations cost for a retailer, since these workers could be performing other tasks if they were not involved in manually inspecting the product storage areas.

BRIEF DESCRIPTION OF THE DRAWINGS

Disclosed herein are embodiments of systems, apparatuses and methods pertaining to processing captured images of objects at a product storage facility. This description includes drawings, wherein.

Figure 1:
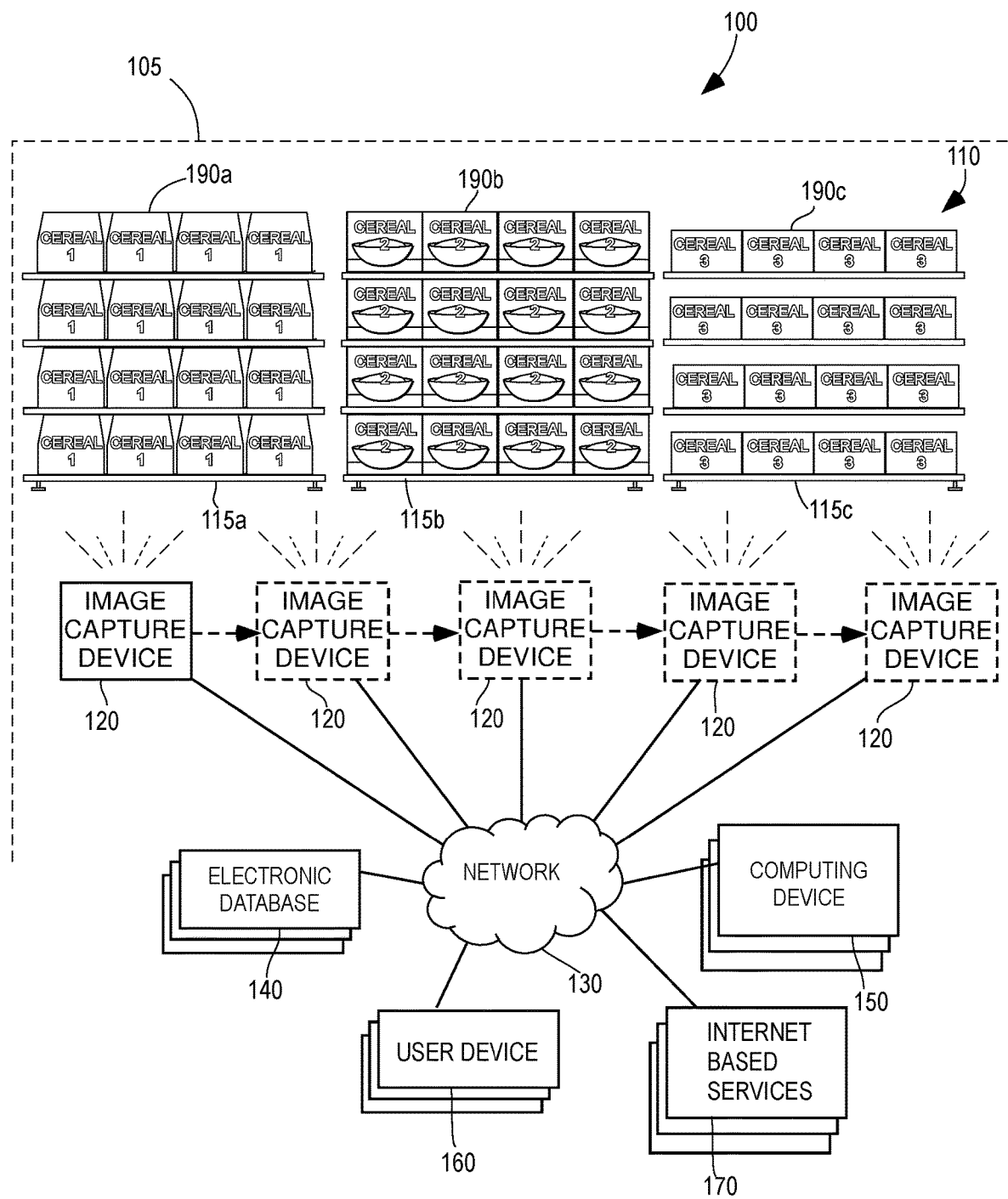
FIG. 1 is a diagram of an exemplary system of updating inventory of products at a product storage facility in accordance with some embodiments, depicting a front view of a product storage area storing groups of various individual products for sale and stored at a product storage facility.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful for processing captured images of objects at a product storage facility. In some embodiments, a system for processing captured images of objects at a product storage facility includes a memory configured to store a plurality of images. The plurality of images may include first images and second images. Each of the first images may contain items not detected by a trained machine learning product recognition model as being associated with a recognized product identifier. Each of the second images may contain items detected by the trained machine learning product recognition model as being associated with multiple recognized product identifiers. In some embodiments, a control circuit executing the trained machine learning product recognition model is configured to: allocate each of the first images into one of a plurality of datasets based on areas in the product storage facility the first images were captured. Alternatively or in addition to, for each dataset of the plurality of datasets, the control circuit executing the trained machine learning product recognition model may cluster each image in the dataset into one of a plurality of groups based on a degree of resemblance of items depicted in the image relative to those items depicted in other images in the dataset. Alternatively or in addition to, the control circuit executing the trained machine learning product recognition model may select a sample from at least one of the plurality of groups. Alternatively or in addition to, the control circuit executing the trained machine learning product recognition model may cluster each of the second images into one of dominant product identifier group and a non-dominant product identifier group. Alternatively or in addition to, the control circuit executing the trained machine learning product recognition model may select a sample from the dominant product identifier group. Alternatively or in addition to, the control circuit executing the trained machine learning product recognition model may select a sample from the non-dominant product identifier group. Alternatively or in addition to, the control circuit executing the trained machine learning product recognition model may output the selected sample from the at least one of the plurality of groups, the selected sample from the dominant product identifier group, and the selected sample from the non-dominant product identifier group to be used to retrain the trained machine learning product recognition model.

In some embodiments, a method for processing captured images of objects at a product storage facility. The method may include storing, by a memory, a plurality of images. In some embodiments, the plurality of images include first images and second images. Each of the first images may contain items not detected by a trained machine learning product recognition model as being associated with a recognized product identifier. Each of the second images may contain items detected by the trained machine learning product recognition model as being associated with multiple recognized product identifiers. Alternatively or in addition to, the method may include allocating, by a control circuit executing the trained machine learning product recognition model, each of the first images into one of a plurality of datasets based on areas in the product storage facility the first images were captured. Alternatively or in addition to, the method may include for each dataset of the plurality of datasets, clustering, by a control circuit executing the trained machine learning product recognition model, each image in the dataset into one of a plurality of groups based on a degree of resemblance of items depicted in the image relative to those items depicted in other images in the dataset. Alternatively or in addition to, the method may include selecting, by a control circuit executing the trained machine learning product recognition model, a sample from at least one of the plurality of groups. Alternatively or in addition to, the method may include clustering, by a control circuit executing the trained machine learning product recognition model, each of the second images into one of dominant product identifier group and a non-dominant product identifier group. Alternatively or in addition to, the method may include selecting, by a control circuit executing the trained machine learning product recognition model, a sample from the dominant product identifier group. Alternatively or in addition to, the method may include selecting, by a control circuit executing the trained machine learning product recognition model, a sample from the non-dominant product identifier group. Alternatively or in addition to, the method may include outputting, by a control circuit executing the trained machine learning product recognition model, the selected sample from the at least one of the plurality of groups, the selected sample from the dominant product identifier group, and the selected sample from the non-dominant product identifier group to be used to retrain the trained machine learning product recognition model.

FIG. 1 shows an embodiment of a system 100 of updating inventory of products for sale and stored at product storage areas 110 and/or on product storage structures 115 of a product storage facility 105 (which may be a retail store, a product distribution center, a fulfillment center, a warehouse, etc.). The system 100 is illustrated in FIG. 1 for simplicity with only one movable image capture device 120 that moves about one product storage area 110 containing three separate product storage structures 115a, 115b, and 115c, but it will be appreciated that, depending on the size of the product storage facility, the system 100 may include multiple movable image capture devices 120 located throughout the product storage facility that monitor hundreds of product storage areas 110 and thousands of product storage structures 115a-115c. It is understood that the movement about the product storage area 110 by the image capture device(s) 120 may depend on the physical arrangement of the product storage area 110 and/or the size and shape of the product storage structure 115. For example, the image capture device 120 may move linearly down an aisle alongside a product storage structure 115 (e.g., a shelving unit), or may move in a circular fashion around a table having curved or multiple sides.

Notably, the term "product storage structure" as used herein generally refers to a structure on which products 190a-190c are stored, and may include a rack, a pallet, a shelf cabinet, a single shelf, a shelving unit, table, rack, displays, bins, gondola, case, countertop, or another product display. Likewise, it will be appreciated that the number of individual products 190a-190c representing three exemplary distinct products (labeled as "Cereal 1," "Cereal 2," and "Cereal 3") is chosen by way of example only. Further, the size and shape of the products 190a-190c in FIG. 1 have been shown by way of example only, and it will be appreciated that the individual products 190a-190c may have various sizes and shapes. Notably, the term products 190 may refer to individual products 190 (some of which may be single-piece/single-component products and some of which may be multi-piece/multi-component products), as well as to packages or containers of products 190, which may be plastic- or paper-based packaging that includes multiple units of a given product 190 (e.g., a plastic wrap that includes 36 rolls of identical paper towels, a paper box that includes 10 packs of identical diapers, etc.). Alternatively, the packaging of the individual products 190 may be a plastic- or paper-based container that encloses one individual product 190 (e.g., a box of cereal, a bottle of shampoo, etc.).

The image capture device 120 (also referred to as an image capture unit) of the exemplary system 100 depicted in FIG. 1 is configured to move around the product storage facility (e.g., on the floor via a motorized or non-motorized wheel-based/track-based locomotion system, via slidable tracks above the floor, via a toothed metal wheel/linked metal tracks system, etc.) such that, when moving (e.g., about an aisle or other area of a product storage facility 105), the image capture device 120 has a field of view that includes at least a portion of one or more of the product storage structures 115a-115c within a given product storage area 110 of the product storage facility 105, permitting the image capture device 120 to capture multiple images of the product storage area 110 from various viewing angles. In some embodiments, the image capture device 120 is configured as a robotic device that moves without being physically operated/manipulated by a human operator (as described in more detail below). In other embodiments, the image capture device 120 is configured to be driven or manually pushed (e.g., like a cart or the like) by a human operator. In still further embodiments, the image capture device 120 may be a hand-held or a wearable device (e.g., a camera, phone, tablet, or the like) that may be carried and/or work by a worker at the product storage facility 105 while the worker moves about the product storage facility 105. In some embodiments, the image capture device 120 may be incorporated into another mobile device (e.g., a floor cleaner, floor sweeper, forklift, etc.), the primary purpose of which is independent of capturing images of product storage areas 110 of the product storage facility 105.

In some embodiments, as will be described in more detail below, the images of the product storage area 110 captured by the image capture device 120 while moving about the product storage area are transmitted by the image capture device 120 over a network 130 to an electronic database 140 and/or to a computing device 150. In some aspects, the computing device 150 (or a separate image processing internet-based/cloud-based service module) is configured to process such images as will be described in more detail below.

The exemplary system 100 shown in FIG. 1 includes an electronic database 140. Generally, the exemplary electronic database 140 may be configured as a single database, or a collection of multiple communicatively connected databases (e.g., digital image database, meta data database, inventory database, pricing database, customer database, vendor database, manufacturer database, etc.) and is configured to store various raw and processed images of the product storage area 110 captured by the image capture device 120 while the image capture device 120 may be moving around the product storage facility 105. In some embodiments, the electronic database 140 and the computing device 150 may be implemented as two separate physical devices located at the product storage facility 105. It will be appreciated, however, that the computing device 150 and the electronic database 140 may be implemented as a single physical device and/or may be located at different (e.g., remote) locations relative to each other and relative to the product storage facility 105. In some aspects, the electronic database 140 may be stored, for example, on non-volatile storage media (e.g., a hard drive, flash drive, or removable optical disk) internal or external to the computing device 150, or internal or external to computing devices distinct from the computing device 150. In some embodiments, the electronic database 140 may be cloud-based. In some embodiments, the electronic database 140 may include one or more memory devices, computer data storage, and/or cloud-based data storage configured to store one or more of product inventories, pricing, and/or demand, and/or customer, vendor, and/or manufacturer data.

The system 100 of FIG. 1 further includes a computing device 150 configured to communicate with the electronic database 140, user devices 160, and/or internet-based services 170, and the image capture device 120 over the network 130. The exemplary network 130 depicted in FIG. 1 may be a wide-area network (WAN), a local area network (LAN), a personal area network (PAN), a wireless local area network (WLAN), Wi-Fi, Zigbee, Bluetooth (e.g., Bluetooth Low Energy (BLE) network), or any other internet or intranet network, or combinations of such networks. Generally, communication between various electronic devices of system 100 may take place over hard-wired, wireless, cellular, Wi-Fi or Bluetooth networked components or the like. In some embodiments, one or more electronic devices of system 100 may include cloud-based features, such as cloud-based memory storage. In some embodiments, portions of the network 130 are located at or in the product storage facility.

The computing device 150 may be a stationary or portable electronic device, for example, a server, a cloud-server, a series of communicatively connected servers, a computer cluster, a desktop computer, a laptop computer, a tablet, a mobile phone, or any other electronic device including a control circuit (i.e., control unit) that includes a programmable processor. The computing device 150 may be configured for data entry and processing as well as for communication with other devices of system 100 via the network 130. As mentioned above, the computing device 150 may be located at the same physical location as the electronic database 140, or may be located at a remote physical location relative to the electronic database 140.

Figure 2:
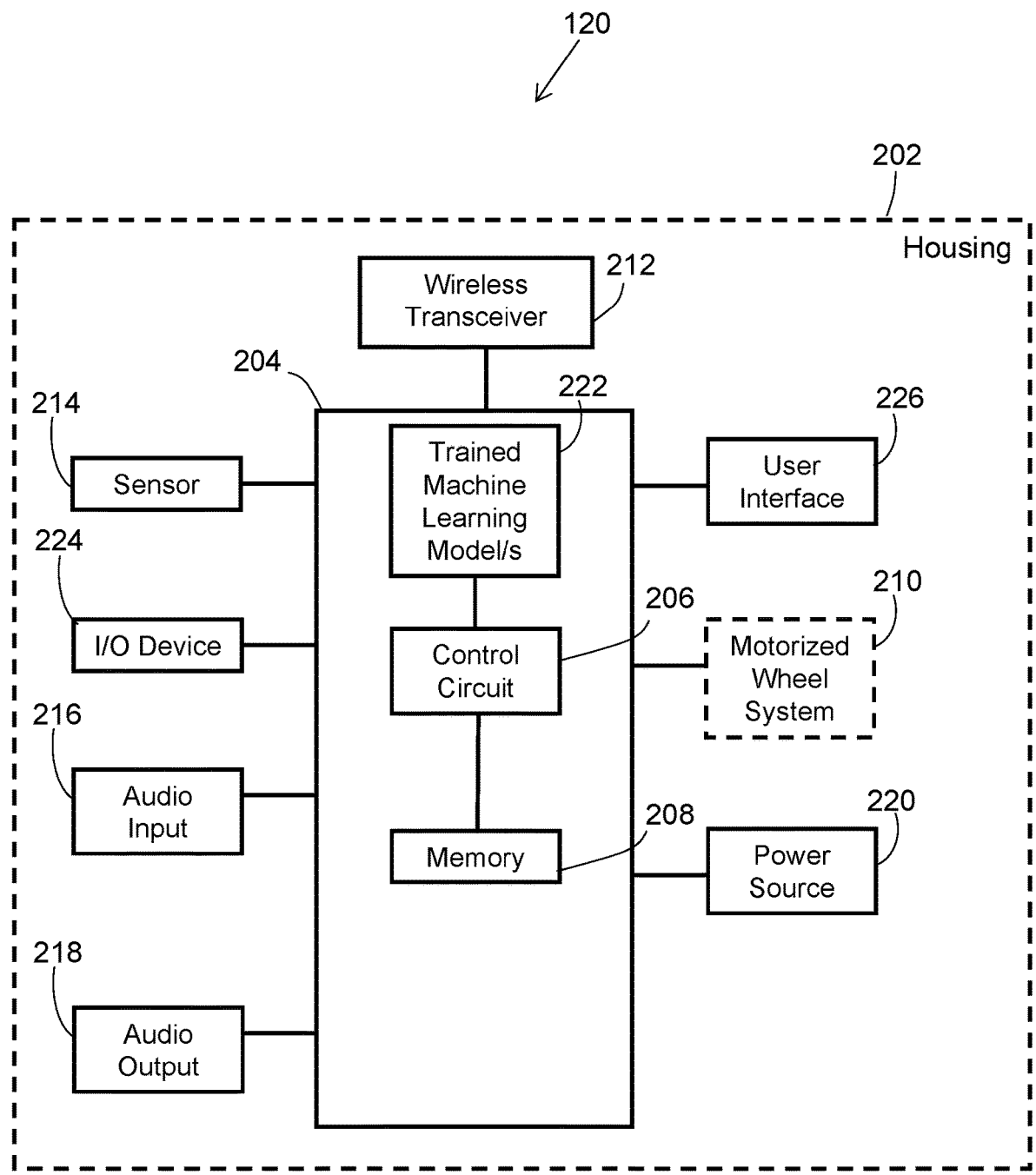
FIG. 2 comprises a block diagram of an exemplary image capture device in accordance with some embodiments.

FIG. 2 presents a more detailed example of an exemplary motorized robotic image capture device 120. As mentioned above, the image capture device 102 does not necessarily need an autonomous motorized wheel-based and/or track-based system to move around the product storage facility 105, and may instead be moved (e.g., driven, pushed, carried, worn, etc.) by a human operator, or may be movably coupled to a track system (which may be above the floor level or at the floor level) that permits the image capture device 120 to move around the product storage facility 105 while capturing images of various product storage areas 110 of the product storage facility 105. In the example shown in FIG. 2, the motorized image capture device 120 has a housing 202 that contains (partially or fully) or at least supports and carries a number of components. These components include a control unit 204 comprising a control circuit 206 that controls the general operations of the motorized image capture device 120 (notably, in some implementations, the control circuit 310 of the computing device 150 may control the general operations of the image capture device 120). Accordingly, the control unit 204 also includes a memory 208 coupled to the control circuit 206 and that stores, for example, computer program code, operating instructions and/or useful data, which when executed by the control circuit implement the operations of the image capture device.

The control circuit 206 of the exemplary motorized image capture device 120 of FIG. 2, operably couples to a motorized wheel system 210, which, as pointed out above, is optional (and for this reason represented by way of dashed lines in FIG. 2). This motorized wheel system 210 functions as a locomotion system to permit the image capture device 120 to move within the product storage facility 105 (thus, the motorized wheel system 210 may be more generically referred to as a locomotion system). Generally, this motorized wheel system 210 may include at least one drive wheel (i.e., a wheel that rotates around a horizontal axis) under power to thereby cause the image capture device 120 to move through interaction with, e.g., the floor of the product storage facility. The motorized wheel system 210 can include any number of rotating wheels and/or other alternative floor-contacting mechanisms (e.g., tracks, etc.) as may be desired and/or appropriate to the application setting.

The motorized wheel system 210 may also include a steering mechanism of choice. One simple example may comprise one or more wheels that can swivel about a vertical axis to thereby cause the moving image capture device 120 to turn as well. It should be appreciated the motorized wheel system 210 may be any suitable motorized wheel and track system known in the art capable of permitting the image capture device 120 to move within the product storage facility 105. Further elaboration in these regards is not provided here for the sake of brevity save to note that the aforementioned control circuit 206 is configured to control the various operating states of the motorized wheel system 210 to thereby control when and how the motorized wheel system 210 operates.

In the exemplary embodiment of FIG. 2, the control circuit 206 operably couples to at least one wireless transceiver 212 that operates according to any known wireless protocol. This wireless transceiver 212 can comprise, for example, a Wi-Fi-compatible and/or Bluetooth-compatible transceiver (or any other transceiver operating according to known wireless protocols) that can wirelessly communicate with the aforementioned computing device 150 via the aforementioned network 130 of the product storage facility. So configured, the control circuit 206 of the image capture device 120 can provide information to the computing device 150 (via the network 130) and can receive information and/or movement instructions (instructions from the computing device 150. For example, the control circuit 206 can receive instructions from the computing device 150 via the network 130 regarding directional movement (e.g., specific predetermined routes of movement) of the image capture device 120 throughout the space of the product storage facility 105. These teachings will accommodate using any of a wide variety of wireless technologies as desired and/or as may be appropriate in a given application setting. These teachings will also accommodate employing two or more different wireless transceivers 212, if desired.

In the embodiment illustrated in FIG. 2, the control circuit 206 also couples to one or more on-board sensors 214 of the image capture device 120. These teachings will accommodate a wide variety of sensor technologies and form factors. According to some embodiments, the image capture device 120 can include one or more sensors 214 including but not limited to an optical sensor, a photo sensor, an infrared sensor, a 3-D sensor, a depth sensor, a digital camera sensor, a mobile electronic device (e.g., a cell phone, tablet, or the like), a quick response (QR) code sensor, a radio frequency identification (RFID) sensor, a near field communication (NFC) sensor, a stock keeping unit (SKU) sensor, a barcode (e.g., electronic product code (EPC), universal product code (UPC), European article number (EAN), global trade item number (GTIN)) sensor, or the like.

By one optional approach, an audio input 216 (such as a microphone) and/or an audio output 218 (such as a speaker) can also operably couple to the control circuit 206. So configured, the control circuit 206 can provide a variety of audible sounds to thereby communicate with workers at the product storage facility or other motorized image capture devices 120 moving around the product storage facility 105. These audible sounds can include any of a variety of tones and other non-verbal sounds. Such audible sounds can also include, in lieu of the foregoing or in combination therewith, pre-recorded or synthesized speech.

The audio input 216, in turn, provides a mechanism whereby, for example, a user (e.g., a worker at the product storage facility 105) provides verbal input to the control circuit 206. That verbal input can comprise, for example, instructions, inquiries, or information. So configured, a user can provide, for example, an instruction and/or query (e.g., where is pallet number so-and-so?, how many products are stocked on pallet number so-and-so? etc.) to the control circuit 206 via the audio input 216.

In the embodiment illustrated in FIG. 2, the motorized image capture device 120 includes a rechargeable power source 220 such as one or more batteries. The power provided by the rechargeable power source 220 can be made available to whichever components of the motorized image capture device 120 require electrical energy. By one approach, the motorized image capture device 120 includes a plug or other electrically conductive interface that the control circuit 206 can utilize to automatically connect to an external source of electrical energy to thereby recharge the rechargeable power source 220.

In some embodiments, the motorized image capture device 120 includes an input/output (I/O) device 224 that is coupled to the control circuit 206. The I/O device 224 allows an external device to couple to the control unit 204. The function and purpose of connecting devices will depend on the application. In some examples, devices connecting to the I/O device 224 may add functionality to the control unit 204, allow the exporting of data from the control unit 206, allow the diagnosing of the motorized image capture device 120, and so on.

In some embodiments, the motorized image capture device 120 includes a user interface 224 including for example, user inputs and/or user outputs or displays depending on the intended interaction with the user (e.g., worker at the product storage facility 105). For example, user inputs could include any input device such as buttons, knobs, switches, touch sensitive surfaces or display screens, and so on. Example user outputs include lights, display screens, and so on. The user interface 224 may work together with or separate from any user interface implemented at an optional user interface unit or user device 160 (such as a smart phone or tablet device) usable by a worker at the product storage facility. In some embodiments, the user interface 224 is separate from the image capture device 202, e.g., in a separate housing or device wired or wirelessly coupled to the image capture device 202. In some embodiments, the user interface may be implemented in a mobile user device 160 carried by a person and configured for communication over the network 130 with the image capture device 102.

In some embodiments, the motorized image capture device 120 may be controlled by the computing device 150 or a user (e.g., by driving or pushing the image capture device 120 or sending control signals to the image capture device 120 via the user device 160) on-site at the product storage facility 105 or off-site. This is due to the architecture of some embodiments where the computing device 150 and/or user device 160 outputs the control signals to the motorized image capture device 120. These controls signals can originate at any electronic device in communication with the computing device 150 and/or motorized image capture device 120. For example, the movement signals sent to the motorized image capture device 120 may be movement instructions determined by the computing device 150; commands received at the user device 160 from a user; and commands received at the computing device 150 from a remote user not located at the product storage facility 105.

In the embodiment illustrated in FIG. 2, the control unit 204 includes a memory 208 coupled to the control circuit 206 and that stores, for example, computer program code, operating instructions and/or useful data, which when executed by the control circuit implement the operations of the image capture device. The control circuit 206 can comprise a fixed-purpose hard-wired platform or can comprise a partially or wholly programmable platform. These architectural options are well known and understood in the art and require no further description here. This control circuit 206 is configured (for example, by using corresponding programming stored in the memory 208 as will be well understood by those skilled in the art) to carry out one or more of the steps, actions, and/or functions described herein. The memory 208 may be integral to the control circuit 206 or can be physically discrete (in whole or in part) from the control circuit 206 as desired. This memory 208 can also be local with respect to the control circuit 206 (where, for example, both share a common circuit board, chassis, power supply, and/or housing) or can be partially or wholly remote with respect to the control circuit 206. This memory 208 can serve, for example, to non-transitorily store the computer instructions that, when executed by the control circuit 206, cause the control circuit 206 to behave as described herein.

In some embodiments, the control circuit 206 may be communicatively coupled to one or more trained computer vision/machine learning/neural network modules 222 to perform at some of the functions. For example, the control circuit 206 may be trained to process one or more images of product storage areas 110 at the product storage facility 105 to detect and/or recognize one or more products 190 using one or more machine learning algorithms, including but not limited to Linear Regression, Logistic Regression, Decision Tree, SVM, Naïve Bayes, kNN, K-Means, Random Forest, Dimensionality Reduction Algorithms, Gradient Boosting Algorithms, Convolutional Neural Network (CNN), Recurrent Neural Network (RNN), Deep Neural Network (DNN), and/or algorithms associated with neural networks. In some embodiments, the trained machine learning model 222 includes a computer program code stored in a memory 208 and/or executed by the control circuit 206 to process one or more images, as described in more detail below.

It is noted that not all components illustrated in FIG. 2 are included in all embodiments of the motorized image capture device 120. That is, some components may be optional depending on the implementation of the motorized image capture device 120.

Figure 3:
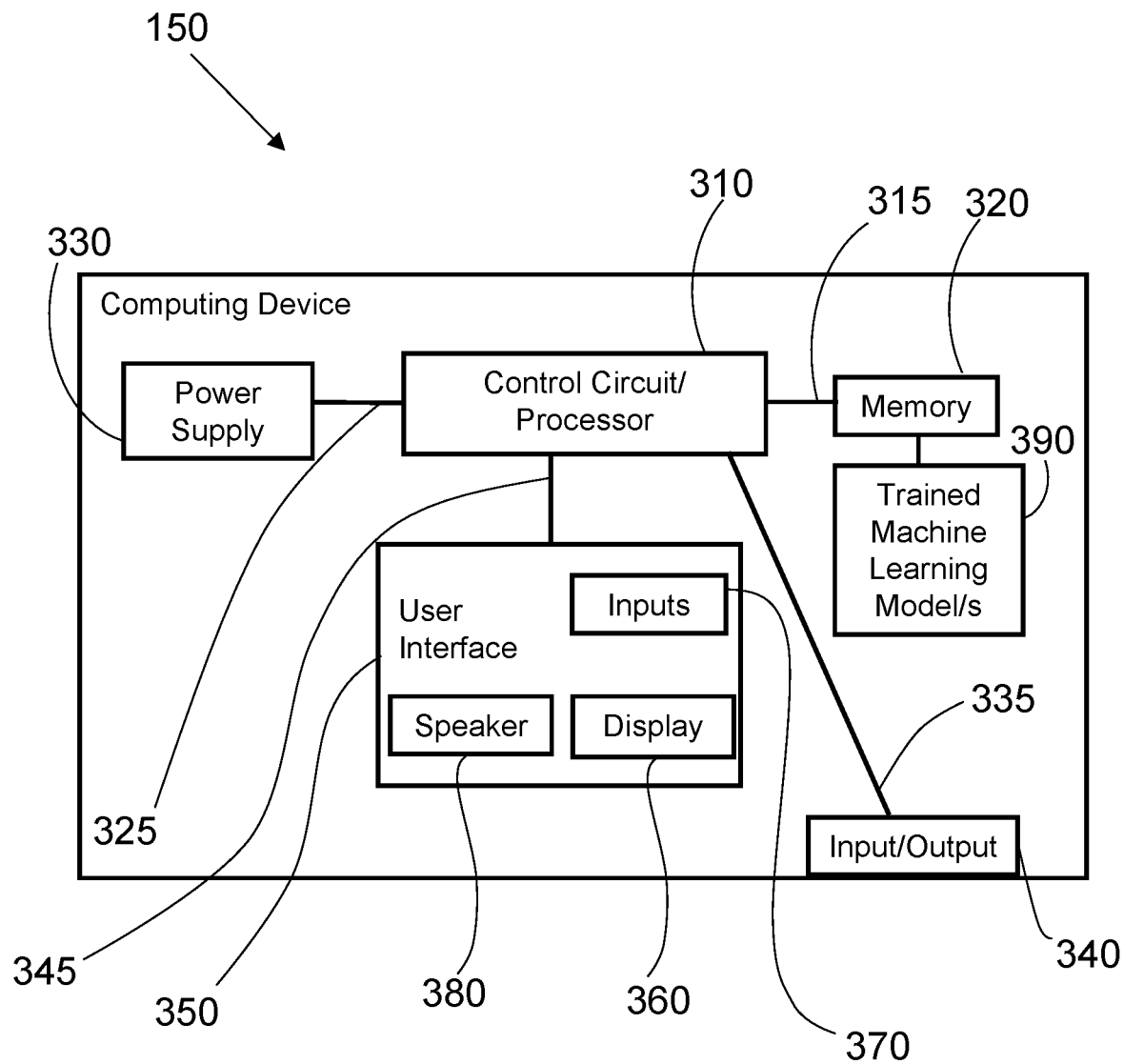
FIG. 3 is a functional block diagram of an exemplary computing device in accordance with some embodiments.

With reference to FIG. 3, the exemplary computing device 150 configured for use with exemplary systems and methods described herein may include a control circuit 310 including a programmable processor (e.g., a microprocessor or a microcontroller) electrically coupled via a connection 315 to a memory 320 and via a connection 325 to a power supply 330. The control circuit 310 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

The control circuit 310 can be configured (for example, by using corresponding programming stored in the memory 320 as will be well understood by those skilled in the art) to carry out one or more of the steps, actions, and/or functions described herein. In some embodiments, the memory 320 may be integral to the processor-based control circuit 310 or can be physically discrete (in whole or in part) from the control circuit 310 and is configured non-transitorily store the computer instructions that, when executed by the control circuit 310, cause the control circuit 310 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control unit may be referred to as a non-transitory medium or non-transitory computer readable medium.

The control circuit 310 of the computing device 150 is also electrically coupled via a connection 335 to an input/output 340 that can receive signals from, for example, from the image capture device 120, etc., the electronic database 140, internet-based services 170 (e.g., image processing services, computer vision services, neural network services, etc.), and/or from another electronic device (e.g., an electronic or user device of a worker tasked with physically inspecting the product storage area 110 and/or the product storage structures 115a-115c and observe the individual products 190a-190c stocked thereon. The input/output 340 of the computing device 150 can also send signals to other devices, for example, a signal to the electronic database 140 including an image of a given product storage structure 115b selected by the control circuit 310 of the computing device 150 as fully showing the product storage structure 115b and each of the products 190b stored in the product storage structure 115b. Also, a signal may be sent by the computing device 150 via the input-output 340 to the image capture device 120 to, for example, provide a route of movement for the image capture device 120 through the product storage facility.

The processor-based control circuit 310 of the computing device 150 shown in FIG. 3 may be electrically or wirelessly coupled via a connection 345 to a user interface 350, which may include a visual display or display screen 360 (e.g., LED screen) and/or button input 370 that provide the user interface 350 with the ability to permit a user (e.g., worker at a the product storage facility 105 or a worker at a remote regional center) to access the computing device 150 by inputting commands via touch-screen and/or button operation and/or voice commands. Possible commands may for example, cause the computing device 150 to cause transmission of an alert signal to an electronic mobile user device 160 of a worker at the product storage facility 105 to assign a task to the worker that requires the worker to visually inspect and/or restock a given product storage structure 115a-115c based on analysis by the computing device 150 of the image of the product storage structure 115a-115c captured by the image capture device 120.

In some embodiments, the user interface 350 of the computing device 150 may also include a speaker 380 that provides audible feedback (e.g., alerts) to the operator of the computing device 150. It will be appreciated that the performance of such functions by the processor-based control circuit 310 of the computing device 150 is not dependent on a human operator, and that the control circuit 210 may be programmed to perform such functions without a human user.

As pointed out above, in some embodiments, the image capture device 120 moves around the product storage facility 105 (while being controlled remotely by the computing device 150 (or another remote device such as the user device 160), or while being controlled autonomously by the control circuit 206 of the image capture device 120), or while being manually driven or pushed by a worker of the product storage facility 105. When the image capture device 120 moves about the product storage area 110 as shown in FIG. 1, the sensor 214 of the image capture device 120, which may be one or more digital cameras, captures (in sequence) multiple images of the product storage area 110 from various angles. In some aspects, the control circuit 310 of the computing device 150 obtains (e.g., from the electronic database 140 or directly from the image capture device 120) the images of the product storage area 110 captured by the image capture device 120 while moving about the product storage area 110.

The sensor 214 (e.g., digital camera) of the image capture device 120 is located and/or oriented on the image capture device 120 such that, when the image capture device 120 moves about the product storage area 110, the field of view of the sensor 214 includes only portions of adjacent product storage structures 115a-115c, or an entire product storage structure 115a-115c. In certain aspects, the image capture device 120 is configured to move about the product storage area 110 while capturing images of the product storage structures 115a-115c at certain predetermined time intervals (e.g., every 1 second, 5 seconds, 10 seconds, etc.).

The images captured by the image capture device 120 may be transmitted to the electronic database 140 for storage and/or to the computing device 150 for processing by the control circuit 310 and/or to a web-/cloud-based image processing service 170. In some embodiments, one or more of the image capture devices 120 of the exemplary system 100 depicted in FIG. 1 is mounted on or coupled to a motorized robotic unit similar to the motorized robotic image capture device 120 of FIG. 2.

In some embodiments, one or more of the image capture devices 120 of the exemplary system 100 depicted in FIG. 1 is configured to be stationary or mounted to a structure, such that the image capture device 120 may capture one or more images of an area having one or more products at the product storage facility. For example, the area may include a product storage area 110, and/or a portion of and/or an entire product storage structures 115a-115c of the product storage facility.

In some embodiments, the electronic database 140 stores data corresponding to the inventory of products in the product storage facility. The control circuit 310 processes the images captured by the image capture device 120 and causes an update to the inventory of products in the electronic database 140. In some embodiments, one or more steps in the processing of the images are via machine learning and/or computer vision models that may include one or more trained neural network models. In certain aspects, the neural network may be a deep convolutional neural network. The neural network may be trained using various data sets, including, but not limited to: raw image data extracted from the images captured by the image capture device 120; metadata extracted from the images captured by the image capture device 120; reference image data associated with reference images of various product storage structures 115a-115c at the product storage facility; reference images of various products 190a-190c stocked and/or sold at the product storage facility; and/or planogram data associated with the product storage facility.

Figure 4:
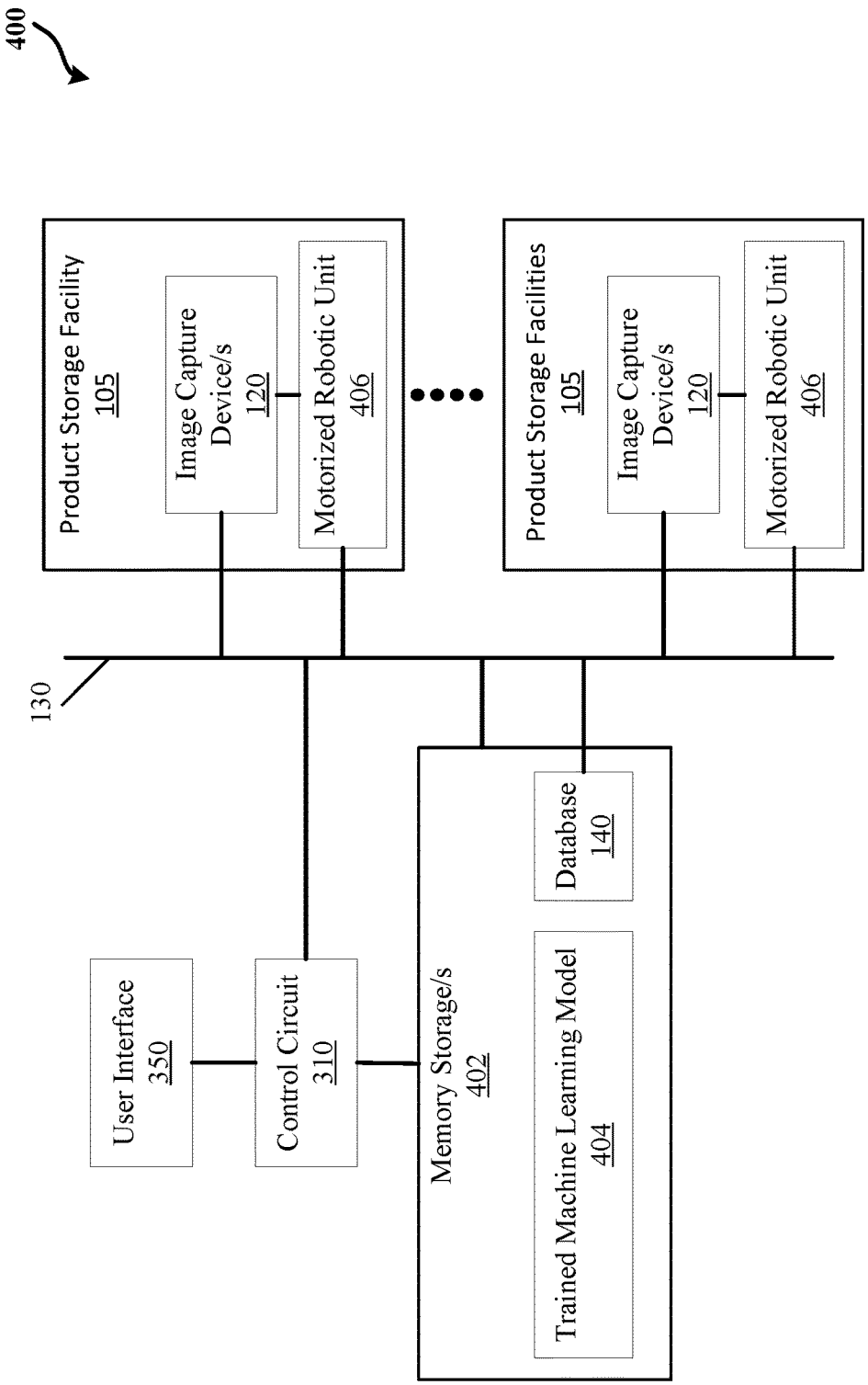
FIG. 4 illustrates a simplified block diagram of an exemplary system for processing captured images of objects at a product storage facility in accordance with some embodiments.

FIG. 4 illustrates a simplified block diagram of an exemplary system for labeling objects in images captured at one or more product storage facilities in accordance with some embodiments. The system 400 includes a control circuit 310. Alternatively or in addition to, the system 400 may include memory storage/s 402, a user interface 350, and/or product storage facilities 105 coupled via a network 130. In some embodiments, the memory storage/s 402 may be one or more of a cloud storage network, a solid state drive, a hard drive, a random access memory (RAM), a read only memory (ROM), and/or any storage devices capable of storing electronic data, or any combination thereof. In some embodiments, the memory storage/s 402 includes the memory 320. In such an embodiment, a trained machine learning model 404 includes trained machine learning model/s 390. In some embodiments, the memory storage/s 402 is separate and distinct from the memory 320. In such an embodiment, the trained machine learning model 404 may be associated with the trained machine learning model/s 390. For example, the trained machine learning model/s 390 may be a copied version of the trained machine learning model 404. Alternatively or in addition to, the trained machine learning model 222 may be a copied version of the trained machine learning model 404. In some embodiments, the processing of unprocessed captured images is processed by the trained machine learning model 222.

In some embodiments, the memory storage/s 402 includes a trained machine learning model 404 and/or a database 140. In some embodiments, the database 140 may be an organized collection of structured information, or data, typically stored electronically in a computer system (e.g. the system 100). In some embodiments, the database 140 may be controlled by a database management system (DBMS). In some embodiments, the DBMS may include the control circuit 310. In yet some embodiments, the DBMS may include another control circuit (not shown) separate and/or distinct from the control circuit 310.

In some embodiments, the control circuit 310 may be communicatively coupled to the trained machine learning model 404 including one or more trained computer vision/machine learning/neural network modules to perform at some or all of the functions described herein. For example, the control circuit 310 using the trained machine learning model 404 may be trained to process one or more images of product storage areas (e.g., aisles, racks, shelves, pallets, to name a few) at product storage facilities 105 to detect and/or recognize one or more products for purchase using one or more machine learning algorithms, including but not limited to Linear Regression, Logistic Regression, Decision Tree, SVM, Naïve Bayes, kNN, K-Means, Random Forest, Dimensionality Reduction Algorithms, Gradient Boosting Algorithms, Convolutional Neural Network (CNN), Recurrent Neural Network (RNN), Deep Neural Network (DNN), and/or algorithms associated with neural networks. In some embodiments, the trained machine learning model 404 includes a computer program code stored in the memory storage/s 402 and/or executed by the control circuit 310 to process one or more images, as described herein.

The product storage facility 105 may include one of a retail store, a distribution center, and/or a fulfillment center. In some embodiments, a user interface 350 includes an application stored in a memory (e.g., the memory 320 or the memory storage/s 402) and executable by the control circuit 310. In some embodiments, the user interface 350 may be coupled to the control circuit 310 and may be used by a user to at least one of associate a product with at least one depicted object in processed images or resolve that one or more objects depicted in the images is only associated with a single product. In some embodiments, an output of the user interface 350 is used to retrain the trained machine learning model 404.

In some embodiments, the trained machine learning model 404 processes unprocessed captured images. For example, unprocessed captured images may include images captured by and/or output by the image capture device/s 120. Alternatively or in addition to, the unprocessed captured images may include images that have not gone through object detection or object classification by the control circuit 310. In some embodiments, at least some of the unprocessed captured images depict objects in the product storage facility 105.

Figure 5:
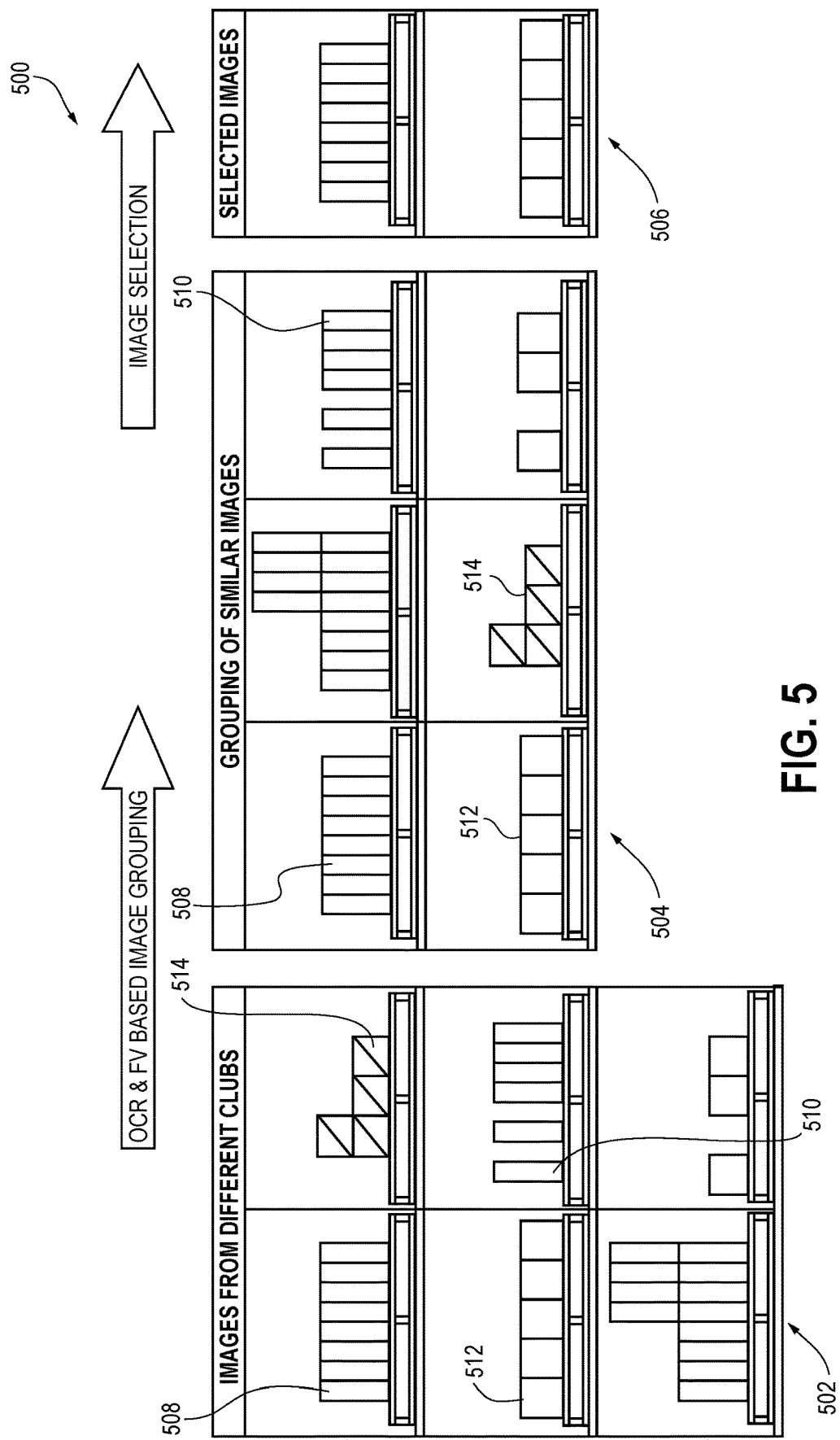
FIG. 5 illustrates an exemplary system for processing captured images of objects at a product storage facility in accordance with some embodiments.
Figure 6:
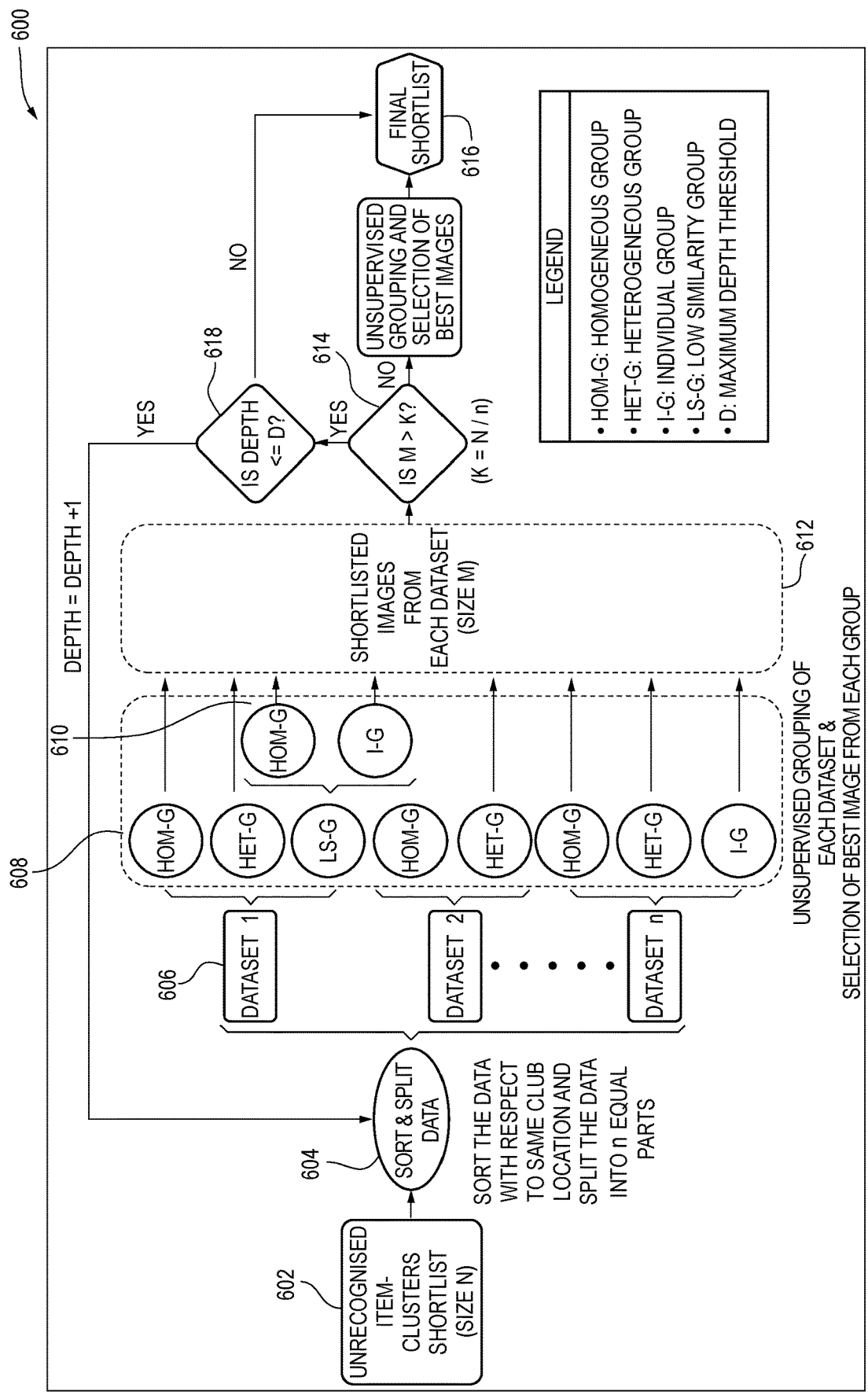
FIG. 6 shows a flow diagram of an exemplary method of processing captured images of objects at a product storage facility in accordance with some embodiments.
Figure 7:
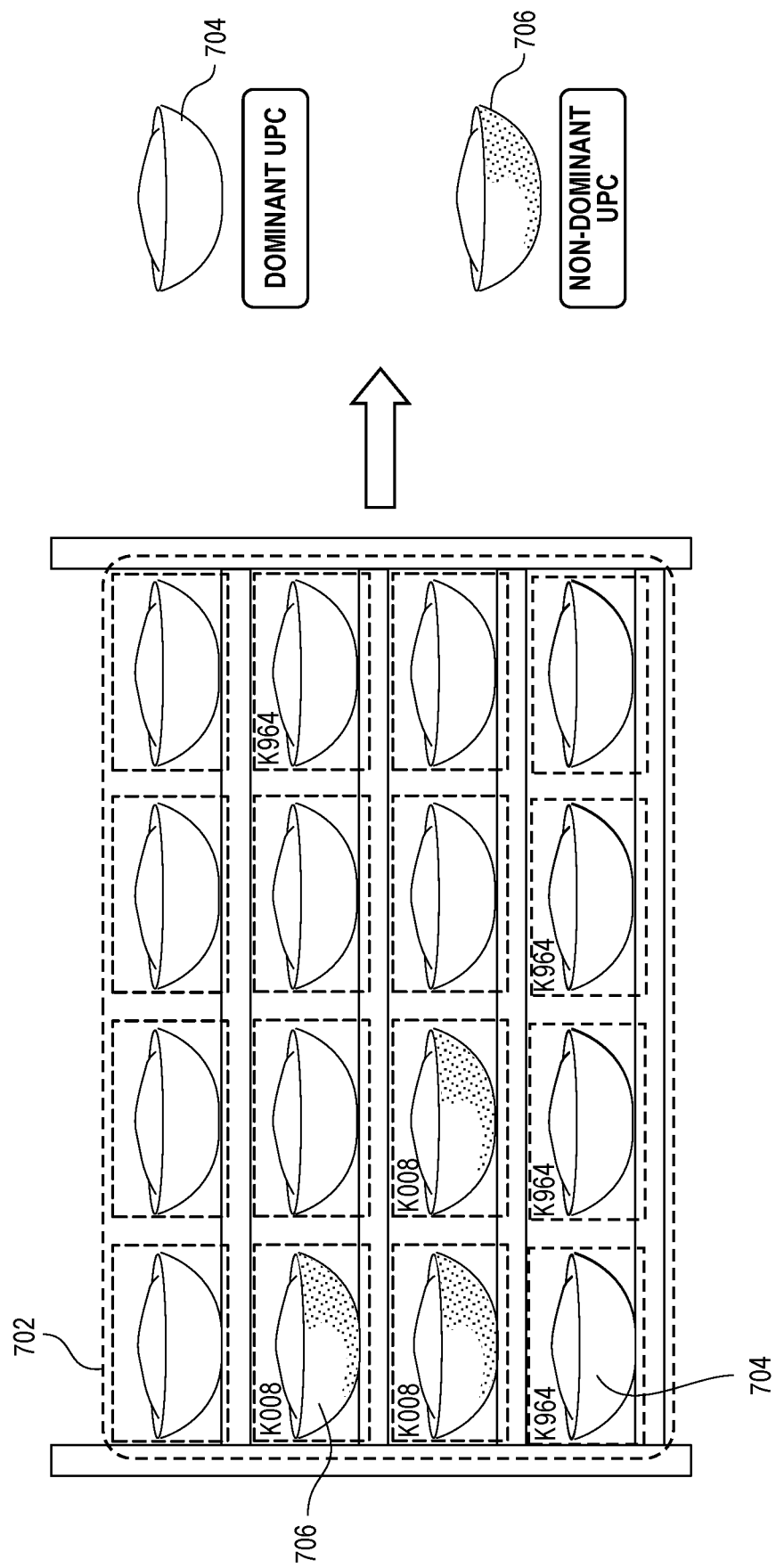
FIG. 7 illustrates an exemplary system for processing captured images of objects at a product storage facility in accordance with some embodiments.
Figure 8:
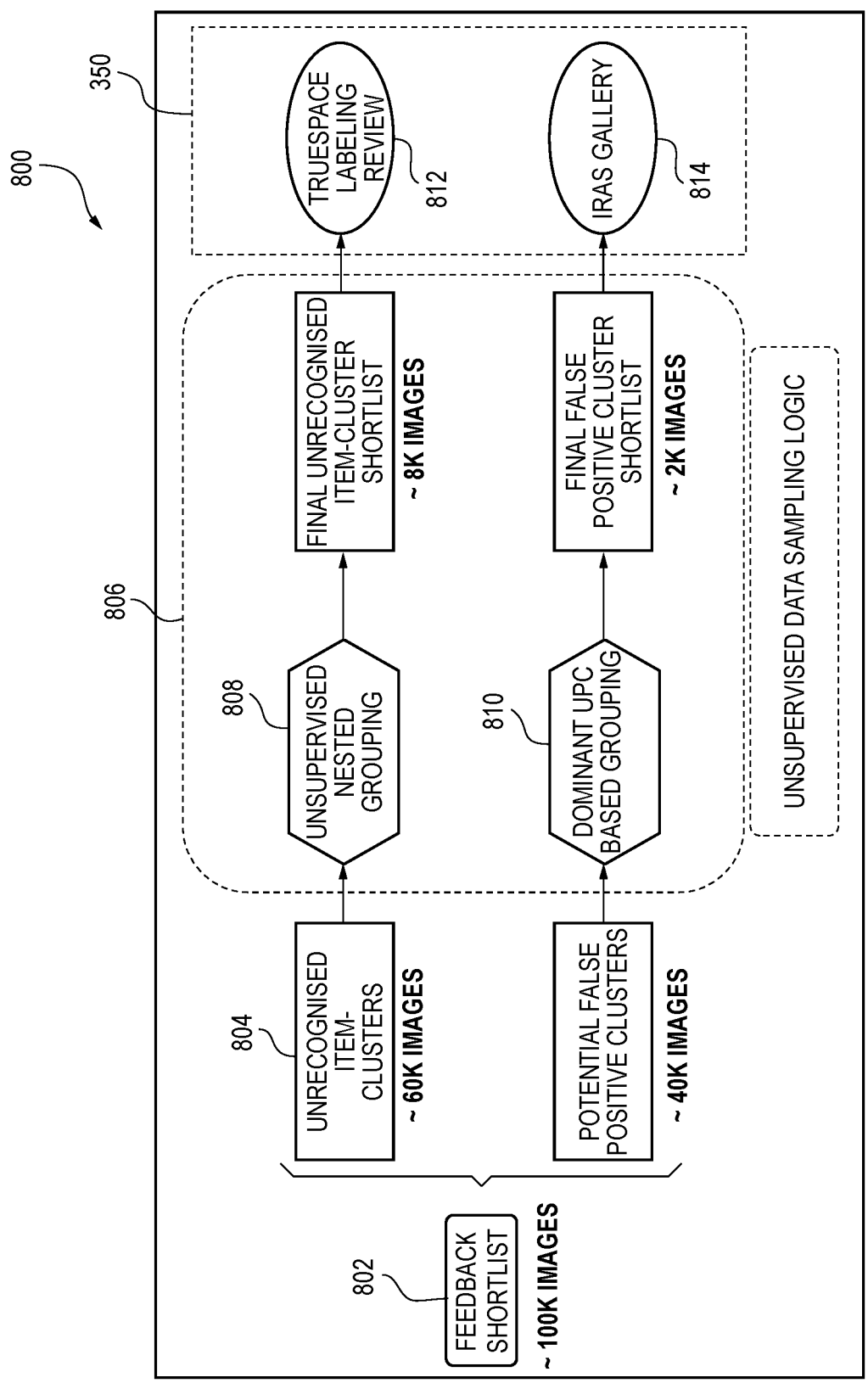
FIG. 8 shows a flow diagram of an exemplary method of processing captured images of objects at a product storage facility in accordance with some embodiments.
Figure 9:
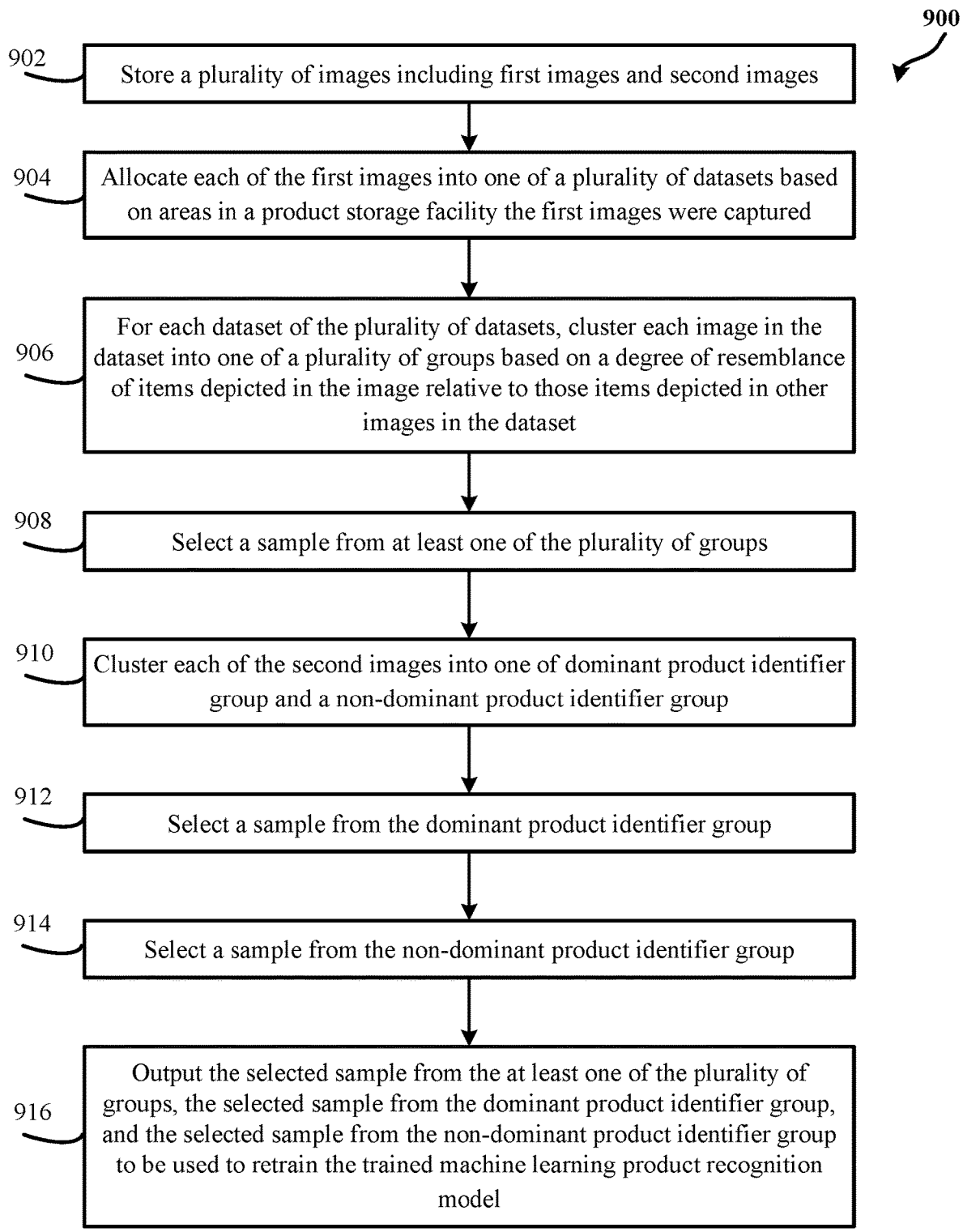
FIG. 9 shows a flow diagram of an exemplary method of processing captured images of objects at a product storage facility in accordance with some embodiments.

Illustrative non-limiting exemplary processing of captured images of objects at one or more product storage facilities 105 are described in FIGS. 5 through 9. FIG. 5 illustrates an exemplary system 500 for processing captured images of objects at one or more product storage facilities 105 in accordance with some embodiments. FIG. 6 shows a flow diagram of an exemplary method 600 of processing captured images of objects at one or more product storage facilities 105 in accordance with some embodiments. FIG. 7 illustrates an exemplary system 700 for processing captured images of objects at a product storage facility in accordance with some embodiments. FIG. 8 shows a flow diagram of an exemplary method 800 of processing captured images of objects at a product storage facility in accordance with some embodiments. FIG. 9 shows a flow diagram of an exemplary method 900 of processing captured images of objects at a product storage facility in accordance with some embodiments.

In some embodiments, a memory (e.g., the memory storage/s 402 and/or the database 140), at step 902, stores a plurality of images. For example, the plurality of images may include first images and/or second images. Each of the first images may contain items not detected by the trained machine learning model 404 and/or the control circuit 310 as being associated with a recognized product identifier. For example, the control circuit 310 and/or the trained machine learning model 404 may detect that there is an object (e.g., an item of a product) on an image. However, the control circuit 310 and/or the trained machine learning model 404 may not be able to identify or recognize what kind of product the object is since the control circuit 310 and/or the trained machine learning model 404 could not determine or recognize a product identifier associated with the object.

In some embodiments, each of the second images may contain items detected by the trained machine learning model 404 and/or the control circuit 310 as being associated with multiple recognized product identifiers. For example, the trained machine learning model 404 and/or the control circuit 310 may detect that there are multiple objects that may be clustered on an image. However, the control circuit 310 and/or the trained machine learning model 404 may determine or recognize more than one product identifier associated with the objects in the cluster.

In an illustrative non-limiting example, the control circuit 310 executing the trained machine learning model 404 may access the memory to obtain a plurality of images or receive the plurality of images captured by the image capture device/s 120. In some embodiments, the plurality of images are images captured by various image capture device/s 120 located in a plurality of areas in various product storage facilities 105. For example, the plurality of areas may include one of an aisle, a bin, a pallet, and/or a rack storing one or more office supply products, grocery products, electronic products, and/or household supply products and/or located in designated retail areas (e.g., baking aisle, beverage aisle, bread aisle, breakfast cereal aisle, candy and snack aisle, canned goods aisle, condiment aisle, dairy aisle, boxed dinners and pasta aisle, paper products and cleaning supplies aisle, personal care products aisle, fresh fruit and veggies section, fresh meat section, and bread and baker section, to name a few).

In some embodiments, the plurality of images may include huge or voluminous images captured from a number of or all product storage facilities 105 associated with a retailer. In some embodiments, the captured images depict various products for purchase that are stored and/or sold at the product storage facilities 105 of the retailer. In some embodiments, some of the products depicted on the captured images may not be recognized by the trained machine learning model 404. As such, the control circuit 310 may need to retrain the trained machine learning model 404 in order for the trained machine learning model 404 to recognize these products the next time these products are presented to the trained machine learning model 404 for recognition and/or identification. In an illustrative non-limiting example, to automatically retrain the trained machine learning model 404, the control circuit 310 using the trained machine learning model 404 may group similar images of the plurality of images together and select sample images from the grouped similar images as illustrated in FIGS. 5-10. Thus, the trained machine learning model 404 is retrained using the selected sample images instead of the plurality of images, which can be voluminous requiring lots of resources (computer and/or manpower) to process in order to retrain a trained machine learning model 404.

In an illustrative non-limiting example, FIGS. 5 and 6 illustrate grouping 504 similar images of the plurality of images together and selecting 506 sample images from the grouped similar images. In some embodiments, the control circuit 310 executing the trained machine learning model 404, at step 904, allocates each of first images 502 into one of a plurality of datasets based on areas in a product storage facility 105 the first images 502 were captured.

For example, a first image 508 is an image that may be captured at the baking aisle of a first product storage facility 105 while a second image 510 is an image that may be captured at the baking aisle of a second product storage facility 105. Another example, a third image 512 is another image that may be captured at the paper products and cleaning supplies aisle of the first product storage facility 105 while a fourth image 514 is another image that may be captured at the paper products and cleaning supplies aisle of the second product storage facility 105. As such, the control circuit 310 and/or the trained machine learning model 404 may allocate the first image 508 and the second image 510 with baking aisle dataset while the third image 512 and the fourth image 514 with paper products and cleaning supplies aisle dataset.

In some embodiments, the trained machine learning model 404 is not able to determine or predict a product identifier for the images 508, 510, 512, 514. In such embodiments, the control circuit 310 executing the trained machine learning model 404 may group images 508, 510, 512, 514 based on textual and/or visual features of the objects depicted in the images 508, 510, 512, 514. The control circuit 310 may use publicly known optical character recognition (OCR) and/or feature vector embedding image processing techniques to group images.

Continuing the illustrative non-limiting example above, for each dataset of the plurality of datasets, the control circuit 310 executing the trained machine learning model 404, at step 906, may cluster each image in the dataset into one of a plurality of groups based on a degree of resemblance of items depicted in the image relative to those items depicted in other images in the dataset. In some embodiments, the control circuit 310 executing the trained machine learning model 404 may determine the degree of resemblance of items based on at least one of a textual similarity or a visual similarity of the items depicted in the images allocated to the same dataset. For example, the control circuit 310 and/or the trained machine learning model 404 may determine how textually and/or visually similar the first image 508 is with the second image 510.

In some embodiments, the plurality of groups that an image may be clustered to include a homogenous group, a heterogeneous group, a low similarity group, and/or an individual group. For example, for the baking aisle dataset, the first image 508 and the second image 510 may be clustered into the homogenous group since the objects depicted in both the first image 508 and the second image 510 are more than 70% textually and/or visually similar. In such example, a homogenous group may include images where the degree of resemblance of items or objects depicted in each image is greater than 70%. It should be appreciated that the threshold for a homogenous grouping may vary in alternative embodiments (e.g., greater than 50%, greater than 60%, greater than 80%, etc.).

In another example, for the paper products and cleaning supplies aisle dataset, the third image 512 and the fourth image 514 may clustered into the heterogeneous group since the objects depicted in both the third image 512 and the fourth image 514 are at least 30% but no more than 70% textually and/or visually similar. In such example, a heterogeneous group may include images where the degree of resemblance of items or objects depicted in each image is at least 30% but no more than 70% textually and/or visually similar. It should be appreciated that the range for a heterogeneous grouping may vary in alternative embodiments (e.g., at least 20% but no more than 80%, at least 10% but no more than 70%, etc.).

In some embodiments, images clustered into a low similarity group may include images where the degree of resemblance (for example, textually and/or visually) of items or objects depicted in each image is less than 30%. In some embodiments, images clustered into an individual group may include images which do not have resemblance with any other image in the dataset. For example, each image in the individual group does not have resemblance with one another nor resemblance with other images in the other group (e.g., the homogenous group, the heterogeneous group, and the low similarity group). It should be appreciated that the threshold for a low similarly grouping may vary in alternative embodiments (e.g., less than 20%, less than 10%, etc.).

Alternatively or in addition to, the control circuit 310 executing the trained machine learning model 404, at step 908, may select a sample from at least one of the plurality of groups. In some embodiments, the control circuit 310 executing the trained machine learning model 404 may select a sample from each of the plurality of groups. Alternatively or in addition to, the control circuit 310 executing the trained machine learning model 404 may output the selected sample to retrain the trained machine learning model 404. In some embodiments, the selected sample from at least one of the plurality of groups includes a sample of one or more images based on a rule. Alternatively or in addition to, the selected sample includes a sample of one or more images from each of the plurality of groups based on the rule.

In some embodiments, for images included in the homogenous group, the rule may include selecting, by the control circuit 310 executing the trained machine learning model 404, at least two or three images based on a highest number of at least one of depicted bounding boxes, boundary box aspect ratio (e.g., different height and width ratio of box may indicate different facings of the same product), or Optical Character Recognition (OCR) count (e.g., text count).

In some embodiments, for images included in the heterogeneous group, the rule may include selecting, by the control circuit 310 executing the trained machine learning model 404, a predetermined percentage of the images included in the heterogeneous group. For example, the percentage value of images to include may be determined by conducting experiments on sample data optimising for UPC and/or product identifier coverage.

In some embodiments, for images included in the individual group, the rule may include selecting, by the control circuit 310 executing the trained machine learning model 404, all images included in the individual group.

In yet some embodiments, the control circuit 310 executing the trained machine learning model 404 may process each image included in the low similarity group by determining the degree of resemblance of items or objects depicted in the image, and/or clustering the image into one of the homogenous group, the heterogeneous group, the low similarity group, or the individual group in accordance with the determined degree of resemblance of the items. Alternatively or in addition to, the control circuit 310 executing the trained machine learning model 404 may repeatedly process subsequent images included in the low similarity group until each of the subsequent images is clustered into one of the homogenous group, the heterogeneous group, or the individual group in accordance with the determined degree of resemblance of the items. In some embodiments, the control circuit 310 executing the trained machine learning model 404 may repeatedly process subsequent images included in the low similarity group until there is no more images to be clustered in the low similarity group.

In some embodiments, the control circuit 310 executing the trained machine learning model 404 may group a sample of one or more images from each of the plurality of groups into a selected sample based on the rule. In such embodiments, the control circuit 310 executing the trained machine learning model 404 may output the selected sample to retrain the trained machine learning model in response to a determination that an image count of the selected sample is less than a threshold. For example, the threshold value may be determined by experimenting on sample datasets optimising for UPC and/or product identifier coverage, process runtime and/or computational memory usage.

Alternatively or in addition to, in response to the determination that the image count of the selected sample is at least the threshold (e.g., equal to and/or greater than the threshold), the control circuit 310 executing the trained machine learning model 404 may allocate each image in the selected sample into one of the plurality of datasets based on the areas in the product storage facility 105 the images in the selected sample were captured. In some embodiments, for each dataset of the plurality of datasets, the control circuit 310 executing the trained machine learning model 404 may cluster each image in the dataset into one of the plurality of groups based on the degree of resemblance of items depicted in the image relative to those items depicted in other images in the dataset. Alternatively or in addition to, the control circuit 310 executing the trained machine learning model 404 may select a second sample from at least one of the plurality of groups. Alternatively or in addition to, the control circuit 310 executing the trained machine learning model 404 may determine whether a second image count of the second sample is less than the threshold. In some embodiments, the control circuit 310 executing the trained machine learning model 404 may output the selected second sample from the at least one of the plurality of groups. In some embodiments, the allocation of each image in the selected second sample into one of the plurality of datasets, the clustering of each image in the dataset into one of the plurality of groups, and/or the selection of a subsequent sample from at least one of the plurality of groups are repeated until the subsequent sample is less than the threshold.

FIG. 6 illustrates another non-limiting example of processing captured images of objects at a product storage facility. In some embodiments, the control circuit 310 and/or the trained machine learning model 404, may process images captured at a plurality of product storage facilities 105 by performing object or item detection (e.g., object or item may be detected but not classified or recognized). In some embodiments, the control circuit 310 and/or the trained machine learning model 404, at step 602, may further process those images depicting unrecognized objects or items (i.e., those images depicting objects/items that are not associated with or estimated to be associated with recognized product identifiers). In some embodiments, the control circuit 310 and/or the trained machine learning model 404, at step 604, may sort and split image data. For example, the image data may be sorted with respect to the same product storage facility location (e.g., image data may be sorted by which product storage facility the image was captured). Alternatively or in addition to, once the image data is sorted, the image data, at step 606, may be split by the control circuit 310 and/or the trained machine learning model 404 into a predetermined equal parts. For example, each part may correspond to a dataset. Alternatively or in addition to, the control circuit 310 and/or the trained machine learning model 404, at step 608, may cluster each image in the dataset into at least one of a homogenous group, a heterogeneous group, a low similarity group, or an individual group based on a degree of resemblance of items depicted in the image relative to those items depicted in other images in the dataset as previously describe above.

Alternatively or in addition to, for those images clustered in the low similarity group, the control circuit 310 and/or the trained machine learning model 404, at step 610, may repeat steps 604, 606, and 608 until there are no images that can be clustered in the low similarity group. Alternatively or in addition to, the control circuit 310 and/or the trained machine learning model 404, at step 612, may select a sample one or more images from each group based on the rule previously described above. In some embodiments, the control circuit 310 and/or the trained machine learning model 404, at step 614, may determine whether a total count of images in the selected sample (i.e., the sum of the selected sample images from all the group) is less than a threshold. In yet some embodiments, the control circuit 310 and/or the trained machine learning model 404, at step 614, may determine whether a count of images in each of the selected sample images is less than a threshold. Alternatively or in addition to, in response to the determination that the count of images is less than the threshold, the control circuit 310 and/or the trained machine learning model 404, at step 616, may output the selected sample images to retrain the trained machine learning model 404. Alternatively or in addition to, in response to the determination that the count of images is equal to or greater than the threshold, the control circuit 310 and/or the trained machine learning model 404, at step 618, may determine whether the steps 604, 606, and 608 have been repeated less than a second threshold (e.g., a predetermined depth threshold). In some embodiments, in response to the 604, 606, and 608 being repeated less than the second threshold, the control circuit 310 and/or the trained machine learning model 404, may repeat steps 604, 606, and 608 until the second threshold is satisfied. In such embodiments, the control circuit 310 and/or the trained machine learning model 404, at step 616, may output the selected sample images to retrain the trained machine learning model 404.

In another illustrative non-limiting example, FIG. 7 illustrates grouping similar images of the plurality of images together and selecting sample images from the grouped similar images. In some embodiments, the memory (e.g., the memory storage/s 402 and/or the database 140), at step 902, stores a plurality of images including the first images and/or the second images. In some embodiments, each of the second images may contain items detected by the trained machine learning model 404 and/or the control circuit 310 as being associated with multiple recognized product identifiers as previously described above. In some embodiments, the control circuit 310 executing the trained machine learning model 404 may determine which one of the product identifiers associated with the objects/items depicted on an image is the most identified or recognized with the depicted objects/items relative to other identified product identifiers of the depicted items in the image. For example, a cluster 702 of objects/items is shown in FIG. 7. In some embodiments, the cluster 702 includes a number of recognized items (e.g., a first recognized item 704 and a second recognized item 706).

Alternatively or in addition to, the control circuit 310 executing the trained machine learning model 404, at step 910, may cluster each of the second images into one of dominant product identifier group and a non-dominant product identifier group. In some embodiments, the control circuit 310 executing the trained machine learning model 404 may cluster objects/items associated with the first recognized item 704 into a dominant product identifier group since the first recognized item 704 is most identified with the depicted objects/items in the cluster 702. In some embodiments, the control circuit 310 executing the trained machine learning model 404 may cluster objects/items associated with the second recognized item 706 into a non-dominant product identifier group since the second recognized item 706 is the least identified with the depicted objects/items in the cluster 702.

In an illustrative non-limiting example, the control circuit 310 executing the trained machine learning model 404 may cluster each image based on the dominant product identifier identified with the depicted objects/items in the image. For example, in FIG. 7, the first recognized item 704 may be associated with the dominant product identifier. In such an example, all images being processed that may have the first recognized item 704 as the dominant product identifier may be grouped together. Moreover, the control circuit 310 and/or the trained machine learning model 404 may cluster other images into other groups based on corresponding dominant product identifiers. For example, a first group may be associated with images having a first particular product identifier dominantly or most depicted in each of the images in the first group. In another example, a second group may be associated with images having a second particular product identifier dominantly or most depicted in each of the images in the second group.

In some embodiments, the control circuit 310 executing the trained machine learning model 404, at step 912, may select a sample one or more images from each of the dominant product identifier groups. For example, for each dominant product identifier group, the selected sample may include at least an image having a threshold range of depicted items being associated with the dominant product identifier. In another example, for each dominant product identifier group, the selected sample may include a single image having a predetermined percentage of the dominant product identifier identified with the depicted objects/items in the image. Alternatively or in addition to, the control circuit 310 executing the trained machine learning model 404 may output the selected sample from each of the dominant product identifier groups to retrain the trained machine learning model 404.

In another illustrative non-limiting example, the control circuit 310 executing the trained machine learning model 404 may cluster each image based on the non-dominant product identifier identified with the depicted objects/items in the image. For example, in FIG. 7, the second recognized item 706 may be associated with the non-dominant product identifier. In such an example, all images being processed that may have the second recognized item 706 as the non-dominant product identifier may be grouped together. Moreover, the control circuit 310 and/or the trained machine learning model 404 may cluster other images into other groups based on corresponding non-dominant product identifiers. For example, a third group may be associated with images having a third particular product identifier least depicted in each of the images in the third group. In another example, a fourth group may be associated with images having a fourth particular product identifier least depicted in each of the images in the fourth group.

In some embodiments, the control circuit 310 executing the trained machine learning model 404, at step 914, may select a sample one or more images from each of the non-dominant product identifier groups. For example, for each non-dominant product identifier group, the selected sample may include at least an image having a second threshold range of depicted items being associated with the non-dominant product identifier. In another example, for each non-dominant product identifier group, the selected sample may include a single image having a second predetermined percentage of the non-dominant product identifier identified with the depicted objects/items in the image. In yet another example, for each non-dominant product identifier group, the selected sample from the non-dominant product identifier groups include all images associated with the non-dominant product identifier groups. Alternatively or in addition to, the control circuit 310 executing the trained machine learning model 404 may output the selected sample from each of the non-dominant product identifier groups to retrain the trained machine learning model 404.

Alternatively or in addition to, the control circuit 310 executing the trained machine learning model 404, at step 916, may output the selected sample from the at least one of the plurality of groups, the selected sample from the dominant product identifier group, and/or the selected sample from the non-dominant product identifier group to be used to retrain the trained machine learning model.

FIG. 8 shows a flow diagram of an exemplary method 800 of processing captured images of objects at one or more product storage facilities 105 in accordance with some embodiments. In some embodiments, the method 800 includes, at step 802, receiving a plurality of processed images including first images and second images. Alternatively or in addition to, the method 800 may include, at step 804, sorting out by the control circuit 310 the first images from the second images. Each of the first images may contain items not detected by the trained machine learning model 404 as being associated with a recognized product identifier. Each of the second images may contain items detected by the trained machine learning model 404 as being associated with multiple recognized product identifiers. Alternatively or in addition to, the method 800 may include, at step 806, executing the trained machine learning model 404 by the control circuit 310 to perform unsupervised data sampling logic. In some embodiments, for unrecognized item-clusters (i.e., the first images), at step 808, the processing performed by the trained machine learning model 404 to narrow down the images used to retrain the trained machine learning model 404 or itself into a manageable quantity is at least described in FIGS. 5, 6, and 9 above. In some embodiments, for potential false positive clusters (i.e., the second images), at step 810, the processing performed by the trained machine learning model 404 to narrow down the images used to retrain the trained machine learning model 404 or itself into a manageable quantity is at least described in FIGS. 7 and 9 above. In some embodiments, the selected samples output by the trained machine learning model 404 are provided to the user interface 350 for labeling and/or resolution.

For example, at step 812, the trained machine learning model 404 may predict and provide to the user interface 350 a listing of candidate product identifiers that may include the correct product identifier to label or associate with objects/items detected on the selected samples of the first images. In some embodiments, the listing of candidate product identifiers is displayed in the user interface 350 in an order of either decreasing or increasing confidence values associated with corresponding candidate product identifiers. In some embodiments, the confidence values are values determined by the trained machine learning model 404 indicating the likelihood that a particular candidate product identifier corresponds to the detected object/item on the image selected to be labeled by the user. As such, the training data used to train the trained machine learning model 404 is updated with each user-labeled objects/items on the image or the labeled image. The labeling of these previously unrecognized objects/items may allow the trained machine learning model 404 to be trained on new product identifiers, new products, and/or variations of products that may come into inventory after the initial training of the machine learning model. Additionally, the labeling of these previously unrecognized objects/items may allow the retraining of the trained machine learning model 404 to identify or recognize objects/items that it was previously trained on but was unable to identify or recognize.

In another example, at step 814, the user interface 350 may display the detected objects/items on the selected image of the second images along with the corresponding predictions determined by the trained machine learning model 404 that the objects/items are associated with a dominant product identifier group or a non-dominant product identifier group. As such, the user may confirm that the trained machine learning model 404 made a correct prediction or not. Additionally, the user may resolve whether there are indeed multiple product identifiers associated with the depicted objects/items in the image. Thus, the sampling of data may allow the user to assess the accuracy of the trained machine learning model 404 in identifying or recognizing an object or item depicted in an image, and/or provide or update the training data the trained machine learning model 404 is trained on.

Moreover, the disclosures described herein provides several benefits. For example, the nested grouping logic used for unrecognized item clusters can group large number of images with significantly low runtime and computational memory and scales logarithmically with number of images. As such, system described herein can handle any number of shortlisted images when the trained machine learning model 404 is deployed in significant number of product storage facilities 105. In another example, the group similarity-based image selection and dominant UPC or product identifier based image selection may ensure that best images are selected to represent each UPC or product identifier (e.g., Universal Product Code (UPC), Quick Response (QR) Code, or any other codes used to identify an item or product for sale). In another example, the unsupervised data sampling logic or machine learning algorithm may select an appropriate number of clusters automatically by deciding when to partition a cluster further and when it has achieved enough splits as illustrated in several embodiments herein. Moreover, disclosures described herein may leverage domain knowledge/data like bin location of images along heterogenous data signals like OCR, image feature vector, bbox shape, coordinates, and/or other known image processing techniques for detection and/or classification of objects/items in an image to perform unsupervised data sampling.

Figure 10:
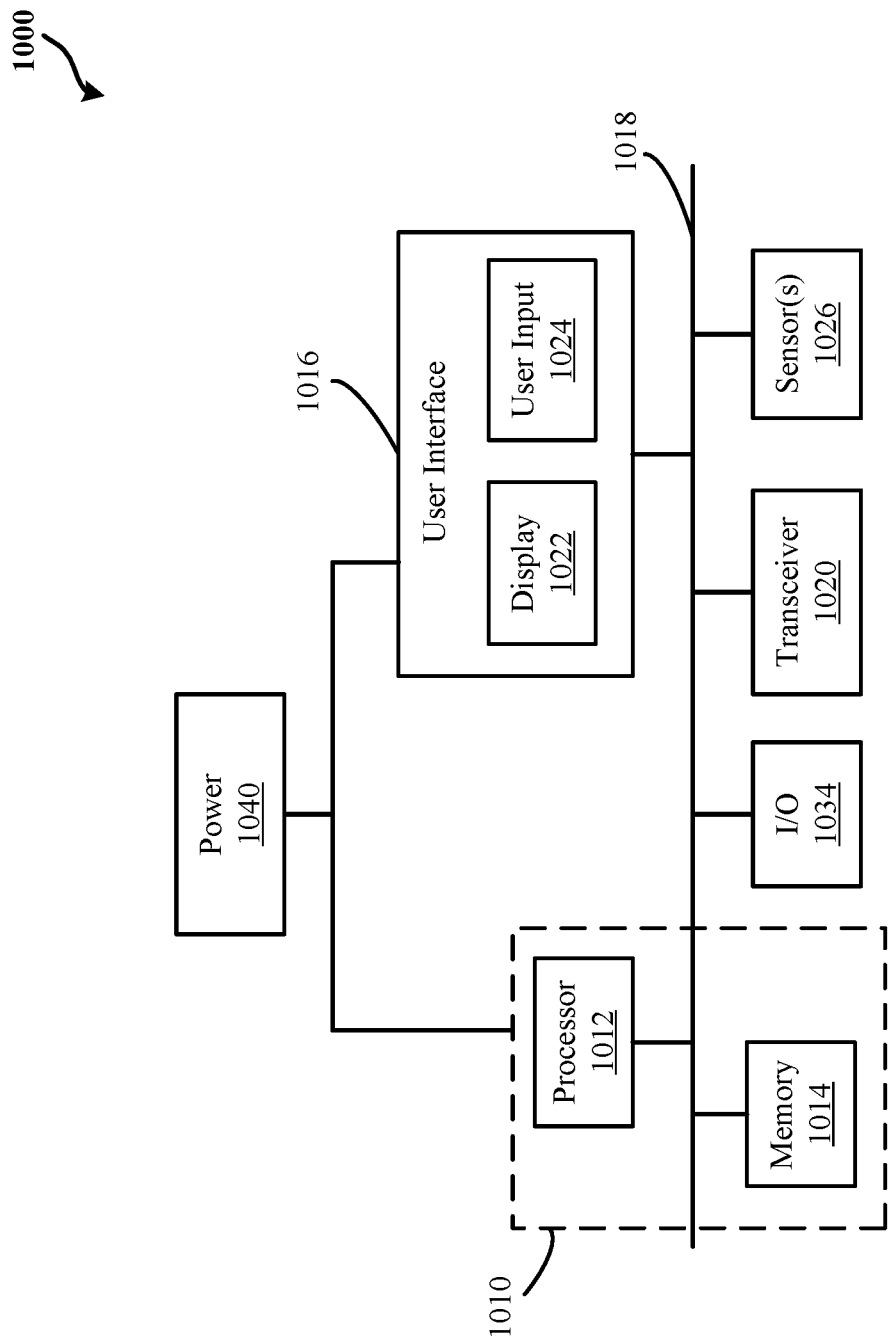
FIG. 10 illustrates an exemplary system for use in implementing methods, techniques, devices, apparatuses, systems, servers, sources and processing captured images of objects at a product storage facility in accordance with some embodiments.

Further, the circuits, circuitry, systems, devices, processes, methods, techniques, functionality, services, servers, sources and the like described herein may be utilized, implemented and/or run on many different types of devices and/or systems. FIG. 10 illustrates an exemplary system 1000 that may be used for implementing any of the components, circuits, circuitry, systems, functionality, apparatuses, processes, or devices of the system 100 of FIG. 1, the movable image capture device 120 of FIG. 2, the computing device 150 of FIG. 3, the system 400 of FIG. 4, the system 500 of FIG. 5, the method 600 of FIG. 6, the system 700 of FIG. 7, the method 800 of FIG. 8, the method 900 of FIG. 9, and/or other above or below mentioned systems or devices, or parts of such circuits, circuitry, functionality, systems, apparatuses, processes, or devices. For example, the system 1000 may be used to implement some or all of the system for processing captured images of objects at a product storage facility, the user interface 350, the computing device 150, the control circuit 310, the memory storage/s 402, the database 140, the network 130, the image capture device/s 120 and the motorized robotic unit 406, and/or other such components, circuitry, functionality and/or devices. However, the use of the system 1000 or any portion thereof is certainly not required.

By way of example, the system 1000 may comprise a processor module (or a control circuit) 1012, memory 1014, and one or more communication links, paths, buses or the like 1018. Some embodiments may include one or more user interfaces 1016, and/or one or more internal and/or external power sources or supplies 1040. The control circuit 1012 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 1012 can be part of control circuitry and/or a control system 1010, which may be implemented through one or more processors with access to one or more memory 1014 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 1000 may be used to implement one or more of the above or below, or parts of, components, circuits, systems, processes and the like. For example, the system 1000 may implement the system for processing captured images of objects at a product storage facility with the control circuit 310 being the control circuit 1012.

The user interface 1016 can allow a user to interact with the system 1000 and receive information through the system. In some instances, the user interface 1016 includes a display 1022 and/or one or more user inputs 1024, such as buttons, touch screen, track ball, keyboard, mouse, etc., which can be part of or wired or wirelessly coupled with the system 1000. Typically, the system 1000 further includes one or more communication interfaces, ports, transceivers 1020 and the like allowing the system 1000 to communicate over a communication bus, a distributed computer and/or communication network (e.g., a local area network (LAN), the Internet, wide area network (WAN), etc.), communication link 1018, other networks or communication channels with other devices and/or other such communications or combination of two or more of such communication methods. Further the transceiver 1020 can be configured for wired, wireless, optical, fiber optical cable, satellite, or other such communication configurations or combinations of two or more of such communications. Some embodiments include one or more input/output (I/O) interface 1034 that allow one or more devices to couple with the system 1000. The I/O interface can be substantially any relevant port or combinations of ports, such as but not limited to USB, Ethernet, or other such ports. The I/O interface 1034 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 1026 to provide information to the system and/or sensor information that is communicated to another component, such as the user interface 350, the computing device 150, the control circuit 310, the memory storage/s 402, the database 140, the network 130, the image capture device/s 120 and the motorized robotic unit 406, etc. The sensors can include substantially any relevant sensor, such as temperature sensors, distance measurement sensors (e.g., optical units, sound/ultrasound units, etc.), optical based scanning sensors to sense and read optical patterns (e.g., bar codes), radio frequency identification (RFID) tag reader sensors capable of reading RFID tags in proximity to the sensor, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 1000 comprises an example of a control and/or processor-based system with the control circuit 1012. Again, the control circuit 1012 can be implemented through one or more processors, controllers, central processing units, logic, software and the like. Further, in some implementations the control circuit 1012 may provide multiprocessor functionality.

The memory 1014, which can be accessed by the control circuit 1012, typically includes one or more processor readable and/or computer readable media accessed by at least the control circuit 1012, and can include volatile and/or non-volatile media, such as RAM, ROM, EEPROM, flash memory and/or other memory technology. Further, the memory 1014 is shown as internal to the control system 1010; however, the memory 1014 can be internal, external or a combination of internal and external memory. Similarly, some or all of the memory 1014 can be internal, external or a combination of internal and external memory of the control circuit 1012. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network. The memory 1014 can store code, software, executables, scripts, data, content, lists, programming, programs, log or history data, user information, customer information, product information, and the like. While FIG. 10 illustrates the various components being coupled together via a bus, it is understood that the various components may actually be coupled to the control circuit and/or one or more other components directly.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

This application is related to the following applications, each of which is incorporated herein by reference in its entirety: entitled SYSTEMS AND METHODS OF SELECTING AN IMAGE FROM A GROUP OF IMAGES OF A RETAIL PRODUCT STORAGE AREA filed on Oct. 11, 2022, application Ser. No. 17/963,787; entitled SYSTEMS AND METHODS OF IDENTIFYING INDIVIDUAL RETAIL PRODUCTS IN A PRODUCT STORAGE AREA BASED ON AN IMAGE OF THE PRODUCT STORAGE AREA filed on Oct. 11, 2022, application Ser. No. 17/963,802; entitled CLUSTERING OF ITEMS WITH HETEROGENEOUS DATA POINTS filed on Oct. 11, 2022, application Ser. No. 17/963,903; entitled SYSTEMS AND METHODS OF TRANSFORMING IMAGE DATA TO PRODUCT STORAGE FACILITY LOCATION INFORMATION filed on Oct. 11, 2022, application Ser. No. 17/963,751; entitled SYSTEMS AND METHODS OF MAPPING AN INTERIOR SPACE OF A PRODUCT STORAGE FACILITY filed on Oct. 14, 2022, application Ser. No. 17/966,580; entitled SYSTEMS AND METHODS OF DETECTING PRICE TAGS AND ASSOCIATING THE PRICE TAGS WITH PRODUCTS filed on Oct. 21, 2022, application Ser. No. 17/971,350; entitled SYSTEMS AND METHODS OF VERIFYING PRICE TAG LABEL-PRODUCT PAIRINGS filed on Nov. 9, 2022, application Ser. No. 17/983,773; entitled SYSTEMS AND METHODS OF USING CACHED IMAGES TO DETERMINE PRODUCT COUNTS ON PRODUCT STORAGE STRUCTURES OF A PRODUCT STORAGE FACILITY filed Jan. 24, 2023, application Ser. No. 18/158,969; entitled METHODS AND SYSTEMS FOR CREATING REFERENCE IMAGE TEMPLATES FOR IDENTIFICATION OF PRODUCTS ON PRODUCT STORAGE STRUCTURES OF A RETAIL FACILITY filed Jan. 24, 2023, application Ser. No. 18/158,983; entitled SYSTEMS AND METHODS FOR PROCESSING IMAGES CAPTURED AT A PRODUCT STORAGE FACILITY filed Jan. 24, 2023, application Ser. No. 18/158,925; and entitled SYSTEMS AND METHODS FOR PROCESSING IMAGES CAPTURED AT A PRODUCT STORAGE FACILITY filed Jan. 24, 2023, application Ser. No. 18/158,950; entitled SYSTEMS AND METHODS OF UPDATING MODEL TEMPLATES ASSOCIATED WITH IMAGES OF RETAIL PRODUCTS AT PRODUCT STORAGE FACILITIES filed Jan. 30, 2023, application Ser. No. 18/102,999; and entitled SYSTEMS AND METHODS FOR DETECTING SUPPORT MEMBERS OF PRODUCT STORAGE STRUCTURES AT PRODUCT STORAGE FACILITIES, filed Jan. 30, 2023, application Ser. No. 18/103,338.

What is claimed is:

1. A system for processing captured images of objects at a product storage facility, the system comprising:
    a memory configured to store a plurality of images, the plurality of images comprising first images and second images, wherein each of the first images contain items not detected by a trained machine learning model as being associated with a recognized product identifier, and wherein each of the second images contain items detected by the trained machine learning model as being associated with multiple recognized product identifiers; and
    a control circuit executing the trained machine learning model configured to:
        allocate each of the first images into one of a plurality of datasets based on areas in the product storage facility the first images were captured;
        for each dataset of the plurality of datasets, cluster each image in the dataset into one of a plurality of groups based on a degree of resemblance of items depicted in the image relative to those items depicted in other images in the dataset;
        select a sample from at least one of the plurality of groups;
        cluster each of the second images into one of a dominant product identifier group and a non-dominant product identifier group;
        select a sample from the dominant product identifier group;
        select a sample from the non-dominant product identifier group; and
        output at least one of the selected sample from the at least one of the plurality of groups, the selected sample from the dominant product identifier group, and the selected sample from the non-dominant product identifier group to be used to retrain the trained machine learning model.

2. The system of claim 1, wherein the plurality of groups comprise a homogenous group, a heterogeneous group, a low similarity group, and an individual group.

3. The system of claim 2, wherein the homogenous group includes images where the degree of resemblance of items depicted in each image is greater than 70%.

4. The system of claim 2, wherein the heterogeneous group includes images where the degree of resemblance of items depicted in each image is at least 30% but no more than 70%.

5. The system of claim 2, wherein the low similarity group includes images where the degree of resemblance of items depicted in each image is less than 30%.

6. The system of claim 2, wherein the individual group includes images that do not have resemblance with any other image in the dataset.

7. The system of claim 2, wherein the control circuit executing the trained machine learning model is further configured to:
    process each image included in the low similarity group by determining the degree of resemblance of items depicted in the image, and clustering the image into one of the homogenous group, the heterogeneous group, the low similarity group, or the individual group in accordance with the determined degree of resemblance of the items; and
    repeat processing of subsequent images included in the low similarity group until each of the subsequent images is clustered into one of the homogenous group, the heterogeneous group, or the individual group in accordance with the determined degree of resemblance of the items.

8. The system of claim 1, wherein the control circuit executing the trained machine learning model is further configured to determine the degree of resemblance of items based on at least one of a textual similarity or a visual similarity of the items.

9. The system of claim 1, wherein the selected sample from the at least one of the plurality of groups comprises a sample of one or more images based on a rule from each of the plurality of groups.

10. The system of claim 9, wherein the control circuit executing the trained machine learning model is further configured to group the sample of the one or more images from each of the plurality of groups into the selected sample, wherein the selected sample is output in response to a determination that an image count of the selected sample is less than a threshold.

11. The system of claim 10, wherein the control circuit executing the trained machine learning model is further configured to:
   in response to a determination that the image count of the selected sample is at least the threshold, allocate each image in the selected sample into one of the plurality of datasets based on the areas in the product storage facility images in the selected sample were captured;
   for each dataset of the plurality of datasets, cluster each image in the dataset into one of the plurality of groups based on the degree of resemblance of items depicted in the image relative to those items depicted in other images in the dataset;
   select a second sample from at least one of the plurality of groups; and
   determine whether a second image count of the second sample is less than the threshold, wherein the allocation of each image in the selected sample into one of the plurality of datasets, the clustering of each image in the dataset into one of the plurality of groups, and the selection of a subsequent sample from at least one of the plurality of groups are repeated until the subsequent sample is less than the threshold.

12. The system of claim 9, wherein the plurality of groups comprise a homogenous group, a heterogeneous group, a low similarity group, and an individual group, and wherein the rule comprises:
   selecting, by the control circuit executing the trained machine learning model and for images included in the homogenous group, at least two or three images based on a highest number of at least one of depicted bounding boxes, boundary box aspect ratio, or Optical Character Recognition (OCR) count;
   selecting, by the control circuit executing the trained machine learning model and for images included in the heterogeneous group, a predetermined percentage of the images included in the heterogeneous group; and
   selecting, by the control circuit executing the trained machine learning model and for images included in the individual group, all images included in the individual group.

13. The system of claim 1, wherein the selected sample from the dominant product identifier group comprises an image having a threshold range of depicted items being associated with a dominant product identifier, wherein the dominant product identifier is a product identifier that is most identified with the depicted items relative to other identified product identifiers of the depicted items in the image.

14. The system of claim 1, wherein the selected sample from the non-dominant product identifier group comprises all images associated with the non-dominant product identifier group.

15. The system of claim 1, wherein the areas comprise one of an aisle, a bin, a pallet, or a rack storing one or more office supply products, grocery products, electronic products, and household supply products.

16. A method for processing captured images of objects at a product storage facility, the method comprising:
   storing, by a memory, a plurality of images, the plurality of images comprising first images and second images, wherein each of the first images contain items not detected by a trained machine learning model as being associated with a recognized product identifier, and wherein each of the second images contain items detected by the trained machine learning model as being associated with multiple recognized product identifiers;
   allocating, by a control circuit executing the trained machine learning model, each of the first images into one of a plurality of datasets based on areas in the product storage facility the first images were captured;
   for each dataset of the plurality of datasets, clustering, by the control circuit executing the trained machine learning model, each image in the dataset into one of a plurality of groups based on a degree of resemblance of items depicted in the image relative to those items depicted in other images in the dataset;
   selecting, by the control circuit executing the trained machine learning model, a sample from at least one of the plurality of groups;
   clustering, by the control circuit executing the trained machine learning model, each of the second images into one of a dominant product identifier group and a non-dominant product identifier group;
   selecting, by the control circuit executing the trained machine learning model, a sample from the dominant product identifier group;
   selecting, by the control circuit executing the trained machine learning model, a sample from the non-dominant product identifier group; and
   outputting, by the control circuit executing the trained machine learning model, at least one of the selected sample from the at least one of the plurality of groups, the selected sample from the dominant product identifier group, and the selected sample from the non-dominant product identifier group to be used to retrain the trained machine learning model.

17. The method of claim 16, wherein the plurality of groups comprise a homogenous group, a heterogeneous group, a low similarity group, and an individual group, wherein the homogenous group includes images where the degree of resemblance of items depicted in each image is greater than 70%, wherein the low similarity group includes images where the degree of resemblance of items depicted in each image is less than 30%, wherein the heterogeneous group includes images where the degree of resemblance of items depicted in each image is at least 30% but no more than 70%, and wherein the individual group includes images that do not have resemblance with any other image in the dataset.

18. The method of claim 16, further comprising determining, by the control circuit executing the trained machine learning model, the degree of resemblance of items based on at least one of a textual similarity or a visual similarity of the items.

19. The method of claim 16, wherein the selected sample from the at least one of the plurality of groups comprises a sample of one or more images based on a rule from each of the plurality of groups.

20. The method of claim 19, further comprising grouping, by the control circuit executing the trained machine learning model, the sample of the one or more images from each of the plurality of groups into the selected sample, wherein the selected sample is output in response to a determination that an image count of the selected sample is less than a threshold.

* * * * *